United States Patent
Uchida

Patent No.: US 6,761,024 B2
Date of Patent: Jul. 13, 2004

(54) AIR-FUEL RATIO CONTROL SYSTEM AND METHOD FOR INTERNAL COMBUSTION ENGINES

(75) Inventor: Takahiro Uchida, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/435,053

(22) Filed: May 12, 2003

(65) Prior Publication Data

US 2003/0213233 A1 Nov. 20, 2003

(30) Foreign Application Priority Data

May 17, 2002 (JP) ........................................ 2002-143393

(51) Int. Cl.[7] ............................................... F01N 3/00
(52) U.S. Cl. ........................................... 60/277; 60/285
(58) Field of Search ........................... 60/274, 277, 285

(56) References Cited

U.S. PATENT DOCUMENTS

| | | | |
|---|---|---|---|
| 5,414,996 A | | 5/1995 | Sawada et al. |
| 5,908,463 A | * | 6/1999 | Akazaki et al. .............. 701/104 |
| 6,351,943 B1 | * | 3/2002 | Tagami et al. ................. 60/285 |
| 6,622,477 B2 | * | 9/2003 | Kobayashi et al. ............ 60/276 |

FOREIGN PATENT DOCUMENTS

| | | |
|---|---|---|
| JP | A 5-133264 | 5/1993 |
| JP | A 5-195842 | 8/1993 |
| JP | A 5-248227 | 9/1993 |
| JP | A 9-72235 | 3/1997 |
| JP | A 10-169493 | 6/1998 |
| JP | A 11-264340 | 9/1999 |

* cited by examiner

Primary Examiner—Thomas E. Denion
(74) Attorney, Agent, or Firm—Oliff & Berridge, PLC

(57) ABSTRACT

When determining a maximum storable oxygen amount of a catalyst disposed in an exhaust passage, a target air-fuel ratio of the gas upstream of the catalyst is set to a predetermined lean air-fuel ratio upon determining that the output of a downstream-side air-fuel ratio sensor indicating a lean air-fuel ratio has changed to indicate a rich air-fuel ratio. Then, a feedback correction amount is calculated such that the air-fuel ratio detected by an upstream-side air-fuel ratio sensor matches the target air-fuel ratio, and a feed-forward amount required for the gas, to be supplied into the internal combustion engine, to become lean is determined. A final injection amount is determined by correcting the feed-forward amount by the feedback correction amount.

9 Claims, 16 Drawing Sheets

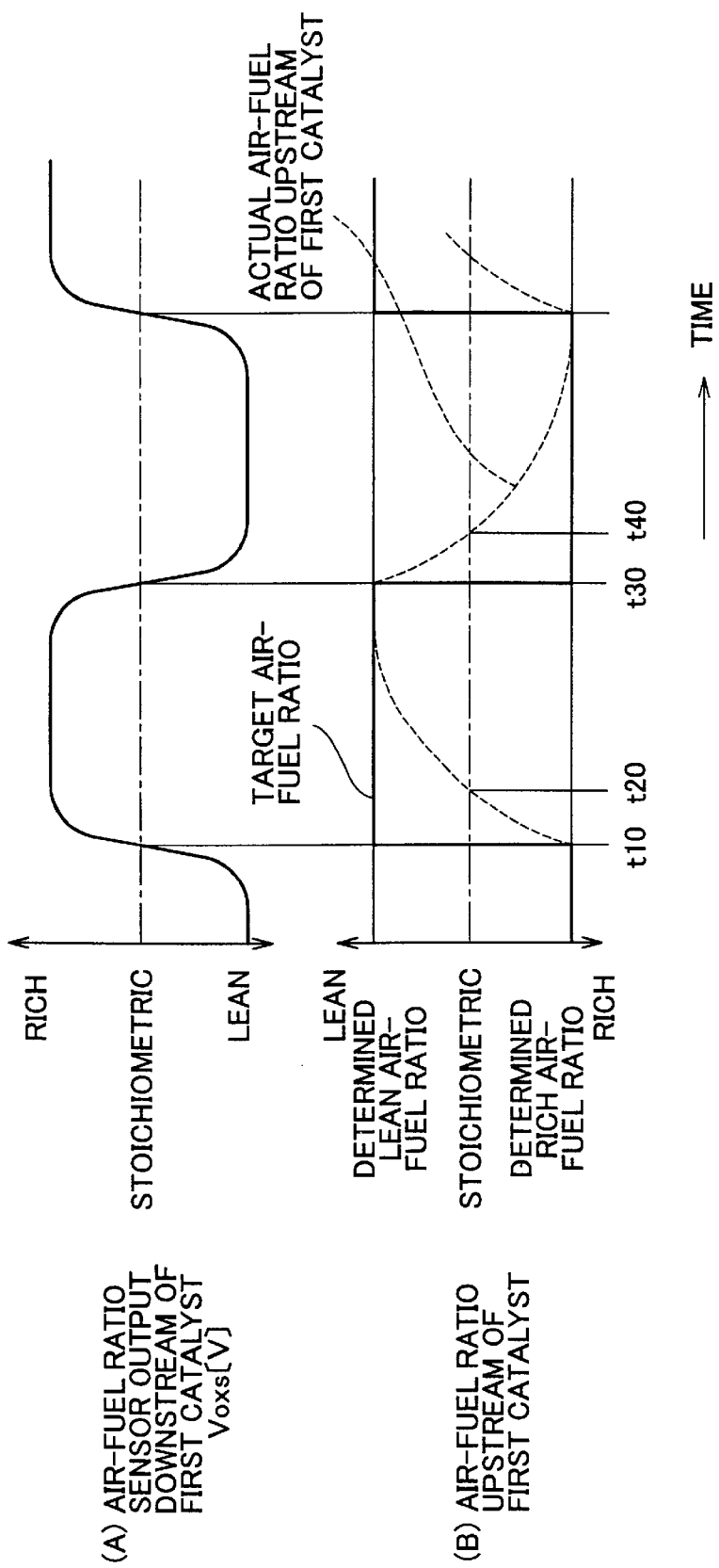

AIR-FUEL RATIO CONTROL SYSTEM AND METHOD FOR INTERNAL COMBUSTION ENGINES

INCORPORATION BY REFERENCE

The disclosure of Japanese Patent Application No. 2002-143393, including the specification, drawings and abstract is incorporated herein by reference in its entirety.

BACKGROUND OF THE INVENTION

1. Field of Invention

The invention relates to air-fuel ratio control system and method for an internal combustion engine including an exhaust passage and a catalyst disposed in the same passage.

2. Description of Related Art

There is known an internal combustion engine including an exhaust passage and a three-way catalyst disposed in the same passage for controlling an exhaust gas. A three-way catalyst (hereinafter will be simply referred to as a "catalyst" where appropriate) is capable of storing oxygen. More specifically, when the air-fuel ratio of the exhaust gas flowing into the catalyst is rich, the catalyst oxidizes unburned components, such as HC and CO, using oxygen stored therein. In contrast, when that air-fuel ratio is lean, the catalyst reduces nitrogen oxides (NOx) and stores the oxygen removed from those nitrogen oxides reduced. Having such capabilities, three way catalysts can be effectively used for purifying an exhaust gas by controlling unburned components and nitrogen oxides, which tend to increase as the air-fuel ratio in the internal combustion engine deviates from the stoichiometric air-fuel ratio. By the way, the purification capacity of such a three-way catalyst becomes larger as the maximum storable oxygen thereof increases.

The maximum storable oxygen amount changes depending upon the state of the catalyst that physically degrades with use. Therefore, it is possible to determine the degradation of the catalyst by estimating its maximum storable oxygen amount.

The catalyst degradation determination system disclosed in Japanese Laid-opened Patent Application No. 5-133264 employs the above concept for determining the degree of the catalyst degradation, as will be described in the following. That is, in this system, the air-fuel ratio in the internal combustion engine, which is namely the air-fuel ratio upstream of the catalyst, is changed from a predetermined rich air-fuel ratio to a predetermined lean air-fuel ratio, or from a predetermined lean air-fuel ratio to a predetermined rich air-fuel ratio. Then, the maximum amount of oxygen storable in the catalyst (hereinafter will be referred to as the "maximum storable oxygen amount of the catalyst") is estimated from a change in the output of an air-fuel ratio sensor disposed downstream of the catalyst during the above shift of the air-fuel ratio upstream of the catalyst, and the degradation degree of the catalyst is determined based on the maximum storable oxygen amount estimated.

More specifically, in the above system, the air-fuel ratio upstream of the catalyst is made equal to the predetermined rich air-fuel ratio by a so-called open-loop control so that the amount of oxygen stored in the catalyst becomes zero, after which the air-fuel ratio upstream of the catalyst is made equal to the predetermined lean air-fuel ratio by another open-loop control upon detecting via the air-fuel ratio sensor disposed downstream of the catalyst that the air-fuel ratio downstream of the catalyst has become rich. Each open-loop control is to perform only a feed-forward control on the air-fuel ratio of an air-fuel mixture (gas) to be supplied into the internal combustion engine (i.e., the air-fuel ratio upstream of the catalyst), rather than performing it in combination with a feedback control on the air-fuel ratio actually detected in the gas ejected from the internal combustion engine.

Subsequently, the system obtains the amount of oxygen entering the catalyst from when the air-fuel ratio upstream of the catalyst is switched to the predetermined lean air-fuel ratio to when it is detected via the air-fuel ratio sensor disposed downstream of the catalyst that the air-fuel ratio downstream of the catalyst has become lean as a result of the oxygen amount stored in the catalyst having reached its full capacity. Eventually, the obtained oxygen amount is estimated as the maximum storable oxygen amount of the catalyst.

Alternatively, the air-fuel ratio upstream of the catalyst is made equal to the predetermined lean air-fuel ratio by an open-loop control so that oxygen is stored in the catalyst to its full capacity, after which the air-fuel ratio upstream of the catalyst is made equal to the predetermined rich air-fuel ratio by another open-loop control upon detecting via the air-fuel ratio sensor disposed downstream of the catalyst that the air-fuel ratio downstream of the catalyst has become lean. Subsequently, the system obtains the amount of oxygen consumed in the catalyst from when the air-fuel ratio upstream of the catalyst is switched to the predetermined rich air-fuel ratio to when it is detected via the air-fuel ratio sensor disposed downstream of the catalyst that the air-fuel ratio downstream of the catalyst has become rich as a result of the oxygen stored in the catalyst having been completely used up. Eventually, the obtained oxygen amount is estimated as the maximum storable oxygen amount of the catalyst.

With such a conventional system, however, because the air-fuel ratio upstream of the catalyst is controlled to the predetermined rich or lean air-fuel ratio by the open loop control described above, it is difficult to preserve sufficient accuracy in controlling the air-fuel ratio due to a change in the engine operation state, a variation among individual engines, and the like. Therefore, there is a possibility that an air-fuel mixture of an excessive rich or lean air-fuel ratio be supplied into the internal combustion engine, which may cause problems like a deterioration in the drivability of the vehicle.

However, such a problem with the above conventional system may be resolved by performing a feedback control on the air-fuel ratio upstream of the catalyst during the calculation of the maximum storable oxygen amount of the catalyst in the following manner. That is, a fuel injection amount required for achieving the stoichiometric air-fuel ratio upstream of the catalyst is predetermined as a basic injection amount. Then, when the target value of the air-fuel ratio upstream of the catalyst is set to the predetermined rich or lean air-fuel ratio aforementioned, a feedback correction amount is determined by executing a so-called PI or PID control on the deviation between the actual air-fuel ratio detected by the air-fuel ratio sensor disposed upstream of the catalyst and the target air-fuel ratio, and the basic injection amount is corrected using the feedback correction amount determined.

However, during such a feedback control, a so-called control delay unavoidably occurs. Therefore, due to such a control delay, the emission may increase during the above feedback control executed for estimating the maximum storable oxygen amount of the catalyst.

That is, referring to the timechart shown in FIG. 17, the target air-fuel ratio is switched to the predetermined lean air-fuel ratio when the air-fuel ratio downstream of the catalyst indicating a lean air-fuel ratio changes to indicate a rich air fuel ratio at the time t10. However, the air-fuel ratio of the gas flowing into the catalyst remains rich until the time t20 due to a delay in the feedback control. Because the stored oxygen amount is zero at this time, unburned components, such as CO, are not reduced in the catalyst.

Likewise, the target air-fuel ratio is switched to the predetermined rich air-fuel ratio when the air-fuel ratio downstream of the catalyst indicating a rich air-fuel ratio changes to indicate a lean air-fuel ratio at the time t30. However, the air-fuel ratio of the gas flowing into the catalyst remains lean until the time t40 due to a delay in the feedback control. Because the stored oxygen amount of the catalyst is equal to its maximum storable oxygen amount at this time, NOx contained in the gas is not reduced.

SUMMARY OF THE INVENTION

In view of the above situation, the invention has been made to provide the following air-fuel mixture control system and method for an internal combustion engine including an exhaust passage and a catalyst disposed in the same passage.

An air-fuel ratio control system according to one aspect of the invention includes: intake volume obtaining means for obtaining a value corresponding to an intake volume of the internal combustion engine; upstream-side air-fuel ratio detecting means for detecting an air-fuel ratio upstream of the catalyst; downstream-side air-fuel ratio detecting means for detecting an air-fuel ratio downstream of the catalyst; target air-fuel ratio setting means which sets a target air-fuel ratio to a predetermined rich air-fuel ratio that is rich of a stoichiometric air-fuel ratio when it is determined that the air-fuel ratio downstream of the catalyst has changed from a rich air-fuel ratio to a lean air-fuel ratio, and which sets the target air-fuel ratio to a predetermined lean air-fuel ratio that is lean of the stoichiometric air-fuel ratio when it is determined that the air-fuel ratio downstream of the catalyst has changed from a lean air-fuel ratio to a rich air-fuel ratio; fuel supply amount calculating means which calculates, as a feed-forward fuel supply amount, a fuel amount required for an air-fuel ratio of an air-fuel mixture, to be supplied to the internal combustion engine, to become rich of the stoichiometric air-fuel ratio on the basis of at least the detected intake volume when the target air-fuel ratio is set to the predetermined rich air-fuel ratio; which calculates, as the feed-forward fuel supply amount, a fuel amount required for the air-fuel ratio of the air-fuel mixture, to be supplied to the internal combustion engine, to become lean of the stoichiometric air-fuel ratio on the basis of at least the detected intake volume when the target air-fuel ratio is set to the predetermined lean air-fuel ratio; which calculates a feedback correction amount based on the air-fuel ratio detected by the upstream-side air-fuel ratio detecting means and the target air-fuel ratio such that the air-fuel ratio detected by the upstream-side air-fuel ratio detecting means matches the target air-fuel ratio; and which determines the feed-forward fuel supply amount corrected by the feedback correction amount as a final fuel supply amount; and fuel supplying means for supplying the internal combustion engine with the same amount of fuel as the final fuel supply amount.

According to this construction, the target air-fuel ratio is set to the predetermined rich air-fuel ratio, a specific air-fuel ratio rich of the stoichiometric air-fuel ratio, when it is determined that the air-fuel ratio downstream of the catalyst has changed from a rich air-fuel ratio to a lean air-fuel ratio. Then, the amount of fuel required for the air-fuel ratio of an air-fuel mixture, to be supplied into the internal combustion engine, to become rich is determined as a feed-forward fuel supply mount based on at least the intake volume, and a feedback correction amount is determined based on the air-fuel ratio upstream of the catalyst and the target air-fuel ratio such that the air-fuel ratio upstream of the catalyst matches the target air-fuel ratio. Subsequently, a final fuel supply amount is determined by correcting the feed-forward fuel supply amount using the feedback correction amount, and the same amount of fuel as the final fuel supply amount determined is supplied into the internal combustion engine.

Likewise, the target air-fuel ratio is set to the predetermined lean air-fuel ratio, a specific air-fuel ratio lean of the stoichiometric air-fuel ratio, when it is determined that the air-fuel ratio downstream of the catalyst has changed from a lean air-fuel ratio to a rich air-fuel ratio. Then, the amount of fuel required for the air-fuel ratio of the air-fuel mixture, to be supplied to the internal combustion engine, to become lean is determined as the feed-forward fuel supply mount based on at least the intake volume, and the feedback correction amount is determined based on the air-fuel ratio upstream of the catalyst and the target air-fuel ratio such that the air-fuel ratio upstream of the catalyst matches the target air-fuel ratio. Subsequently, the final fuel supply amount is determined by correcting the feed-forward fuel supply amount using the feedback correction amount, and the same amount of fuel as the final fuel supply amount determined is supplied into the internal combustion engine.

Namely, with the air-fuel ratio control system described above, when the air-fuel ratio is changed to the specific rich air-fuel ratio upon determining that the actual air-fuel ratio downstream of the catalyst has become lean, a corresponding feed-forward amount is determined, and the determined feed-forward amount is corrected by a feedback correction amount. Thus, the air-fuel ratio upstream of the catalyst can be immediately made rich without suffering from a delay in the feedback control during the time period where the catalyst is fulfilled with oxygen to its full capacity, which prevents the emission of a large amount of NOx.

Likewise, when the air-fuel ratio is changed to the specific lean air-fuel ratio upon determining that the actual air-fuel ratio downstream of the catalyst has become rich, a corresponding feed-forward amount is determined, and the determined feed-forward amount is corrected by the feedback correction amount. Thus, the air-fuel ratio upstream of the catalyst can be immediately made lean without suffering from a delay in the feedback control during the time period where no oxygen is stored in the catalyst, which avoids the emission of a large amount of unburned fuel.

Furthermore, with the air-fuel ratio control system described above, the feed-forward fuel supply amount is corrected using the feedback correction amount when changing the air-fuel ratio of the gas upstream of the catalyst to the predetermined rich or lean air-fuel ratio. Therefore, further accuracy can be achieved in controlling the air-fuel ratio of the gas upstream of the catalyst to the predetermined rich or lean air-fuel ratio.

In the air-fuel ratio control system described above, the feed-forward fuel supply amount may be a value which becomes largest right after the target air-fuel ratio has been switched and which decreases in time.

In this case, it is preferable that the fuel supply amount calculating means be adapted to calculate, as the feedforward fuel supply amount, a fuel amount theoretically required for an air-fuel ratio of the air-fuel mixture, to be supplied into the internal combustion engine, to match the target air-fuel ratio on the basis of the value corresponding to the intake volume and the target air-fuel ratio.

According to this construction, the air-fuel ratio of the gas flowing into the catalyst can be made substantially equal to the target air-fuel ratio right after switching the target air-fuel ratio. This assures improved reliability in preventing an increase in the emissions, and enables the maximum storable oxygen amount of the catalyst, which is an element used for determining the degradation of the catalyst, to be obtained at the constant air-fuel ratio.

Also, it is preferable that the air-fuel ratio control system described above further include maximum storable oxygen amount calculating means which determines an amount of oxygen flowing into the catalyst from when the target air-fuel ratio is changed to the predetermined lean air-fuel ratio to when the air-fuel ratio detected by the downstream-side air-fuel ratio detecting means changes from a rich air-fuel ratio that is rich of the stoichiometric air-fuel ratio to a lean air-fuel ratio that is lean of the stoichiometric air-fuel ratio; and which calculates a maximum storable oxygen amount of the catalyst on the basis of that determined amount of oxygen, and/or it is preferable that the air-fuel ratio control system described above further include maximum storable oxygen amount calculating means which determines an amount of oxygen flowing into the catalyst from when the target air-fuel ratio is changed to the predetermined rich air-fuel ratio to when the air-fuel ratio detected by the downstream-side air-fuel ratio detecting means changes from a lean air-fuel ratio that is lean of the stoichiometric air-fuel ratio to a rich air-fuel ratio that is rich of the stoichiometric air-fuel ratio; and which calculates a maximum storable oxygen amount of the catalyst on the basis of the that determined amount of oxygen.

As described above, the air-fuel ratio upstream of the catalyst can be immediately made equal to the predetermined rich or lean air-fuel ratio in the above-described air-fuel ratio control system. Therefore, when the maximum storable oxygen amount is calculated during the time period from when switching the target air-fuel ratio to when a change in the air-fuel ratio downstream of the catalyst as a result of switching of the same target air-fuel ratio is detected, it is possible to perform that calculation of the maximum storable oxygen amount at a constant air-fuel ratio substantially equal to the predetermined rich or lean air-fuel ratio, so further accuracy can be achieved in determining the degradation of the catalyst.

An air-fuel ratio control method according to another aspect of the invention includes the steps of: obtaining a value corresponding to an intake volume of the internal combustion engine; detecting an air-fuel ratio upstream of the catalyst; detecting an air-fuel ratio downstream of the catalyst; setting a target air-fuel ratio to a predetermined rich air-fuel ratio that is rich of a stoichiometric air-fuel ratio when it is determined that the air-fuel ratio downstream of the catalyst has changed from a rich air-fuel ratio to a lean air-fuel ratio; setting the target air-fuel ratio to a predetermined lean air-fuel ratio that is lean of the stoichiometric air-fuel ratio when it is determined that the air-fuel ratio downstream of the catalyst has changed from a lean air-fuel ratio to a rich air-fuel ratio; calculating, as a feed-forward fuel supply amount, a fuel amount required for an air-fuel ratio of an air-fuel mixture, to be supplied to the internal combustion engine, to become rich of the stoichiometric air-fuel ratio on the basis of at least the intake volume when the target air-fuel ratio is set to the predetermined rich air-fuel ratio; calculating, as the feed-forward fuel supply amount, a fuel amount required for the air-fuel ratio of the air-fuel mixture, to be supplied to the internal combustion engine, to become lean of the stoichiometric air-fuel ratio on the basis of at least the intake volume when the target air-fuel ratio is set to the predetermined lean air-fuel ratio; calculating a feedback correction amount based on the air-fuel ratio detected by the upstream-side air-fuel ratio detecting means and the target air-fuel ratio such that the air-fuel ratio detected by the upstream-side air-fuel ratio detecting means matches the target air-fuel ratio; determining, as a final fuel supply amount, the feed-forward fuel supply amount corrected by the feedback correction amount; and supplying the internal combustion engine with the same amount of fuel as the final fuel supply amount.

In this method, the same effects and advantages as obtained with the air-fuel ratio control system according to the invention described above can be obtained.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein:

FIG. 17 is a timechart indicating changes in the air-fuel ratio under a conventional air-fuel ratio control.

DETAILED DESCRIPTION OF PREFERRED EMBODIMENTS

Figure 1:
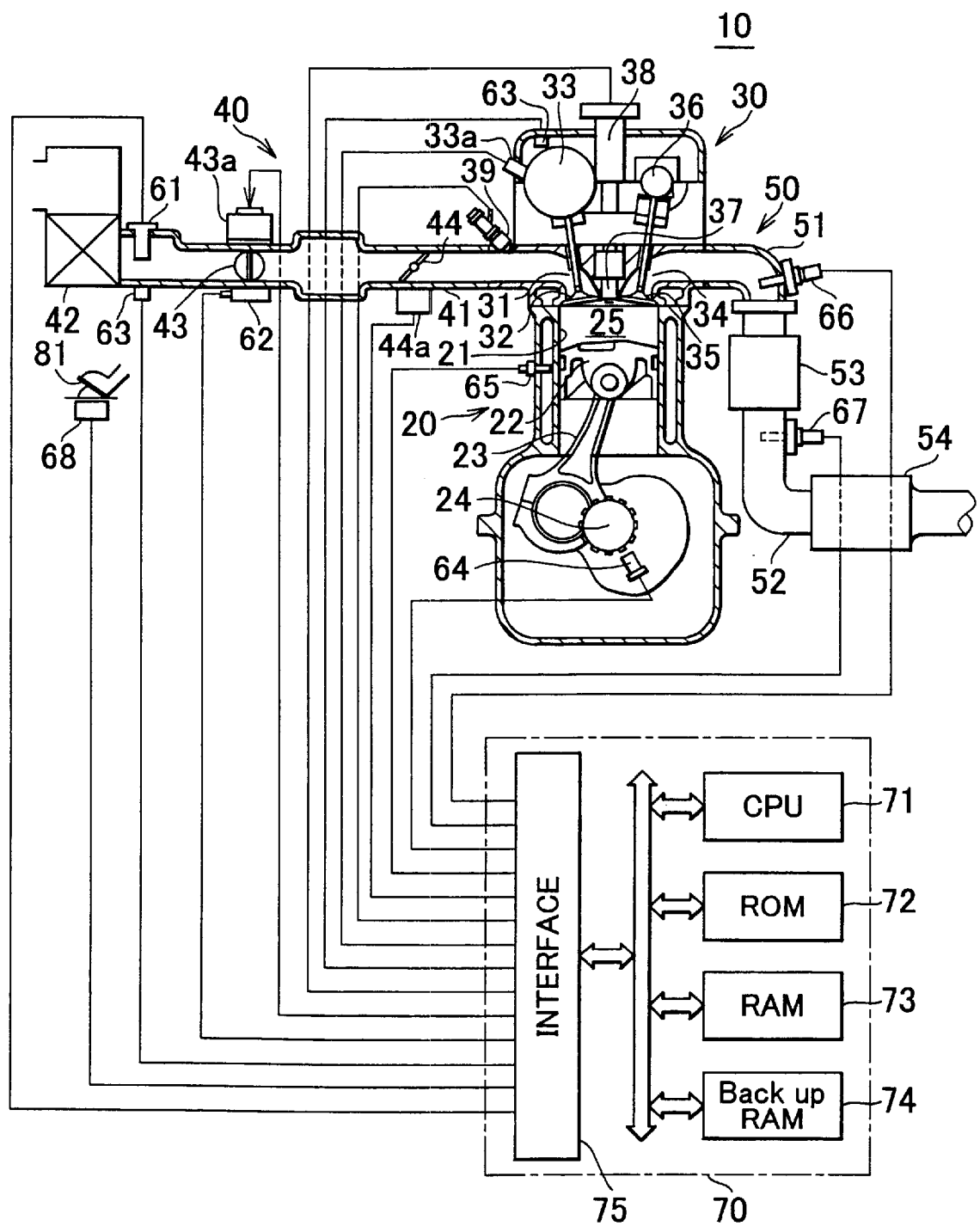
FIG. 1 is a view schematically showing an internal combustion engine incorporating an air-fuel ratio control system according to one embodiment of the invention.

Hereinafter, a preferred embodiment of the invention will be described with reference to the accompanying figures. FIG. 1 is a view schematically showing a four-cylinder internal combustion engine 10 of a spark ignition type incorporating an air-fuel ratio control system according to one embodiment of the invention.

The internal combustion engine 10 is provided with: a cylinder block unit 20 including a cylinder block, a cylinder block lower case, an oil pan, and so on; a cylinder head unit 30 fixed on the cylinder block unit 20; an intake system 40 for supplying air-fuel mixtures (i.e., mixtures of gasoline and air) into the cylinder block unit 20; and an exhaust system 50 for ejecting an exhaust gas from the cylinder block unit 20.

The cylinder block unit 20 also includes cylinders 21, pistons 22, connecting rods 23, and a crankshaft 24. Each piston 22 is disposed within the corresponding one of cylinders 21, and reciprocates therein during engine combustion. The reciprocation of the piston 22 is transmitted to the crankshaft 24 via the connecting rod 23, thus driving the crankshaft 24 to rotate. Below the cylinder head unit 30, a combustion chamber 25 is defined by the inner surface of the cylinder 21 and the top face of the piston 21.

The cylinder head unit 30 includes: a variable intake timing mechanism 33 for continuously changing the phase angle of the intake-cam shaft and including an intake port 31 connected to the combustion chamber 25, an intake valve 32 for opening/closing the intake port 31, an intake cam shaft for driving the intake valve 32, and an actuator 33a for driving the variable intake timing mechanism 33; an exhaust port 34 connected to the combustion chamber 25; an exhaust valve 35 for opening/closing the exhaust valve 35; an exhaust cam-shaft 36 for driving the exhaust valve 35; an ignition plug 37; an ignitor 38 including an ignition coil for generating a high voltage to be applied to the ignition plug 37; and an injector 39 for injecting fuel into the intake port 31 and serving as "fuel supplying means" in the invention.

The intake system 40 includes: an intake pipe 41 including an intake manifold connected to the intake port 31 and constituting an intake passage together with the intake port 31; an air filter 42 disposed at one end of the intake pipe 41; a throttle valve 43 disposed within the intake pipe 41 and adapted to change the cross-sectional opening area of the intake passage; a throttle valve actuator 43a mainly constituted by a DC motor and serving as "throttle valve driving means" in the invention; a swirl control valve (will hereinafter be referred to as a "SCV" where appropriate) 44; and a SCV actuator 44a mainly constituted by a DC motor.

The exhaust system 50 includes: an exhaust manifold 51 connected to the exhaust port 34; an exhaust pipe 52 connected to the exhaust manifold 51; an upstream-side three-way catalyst 53 disposed along the exhaust pipe 52; and a downstream-side three-way catalyst 54 disposed along the exhaust pipe 52 downstream of the upstream-side three-way catalyst 53. Hereinafter, the upstream-side three-way catalyst 53, which is frequently called a "start catalytic converter", will be referred to as the "first catalyst 53", whereas the downstream-side three-way catalyst 54, which is usually disposed below a vehicle floor and therefore is frequently called an "underfloor catalytic converter", will be referred to as the "second catalyst 54." The exhaust port 34, the exhaust manifold 51, and the exhaust pipe 52 together define an exhaust passage of the internal combustion engine 10.

Furthermore, the airflow ratio control system of the embodiment includes: an airflow meter 61 of a hot wire type; a throttle position sensor 62; a cam position sensor 63; a crank position sensor 64; a water temperature sensor 65; an air-fuel ratio sensor 66 disposed in the exhaust pipe 52 upstream of the first catalyst 53; an air fuel ratio sensor 67 disposed in the exhaust pipe 52 downstream of the first catalyst 53 and upstream of the second catalyst 54; and an accelerator opening sensor 68. In the following, the air-fuel ratio sensors 66, 67 will be referred to as the "upstream-side air-fuel ratio sensor 66" and the "downstream-side air-fuel ratio sensor 67", respectively.

Figure 2:
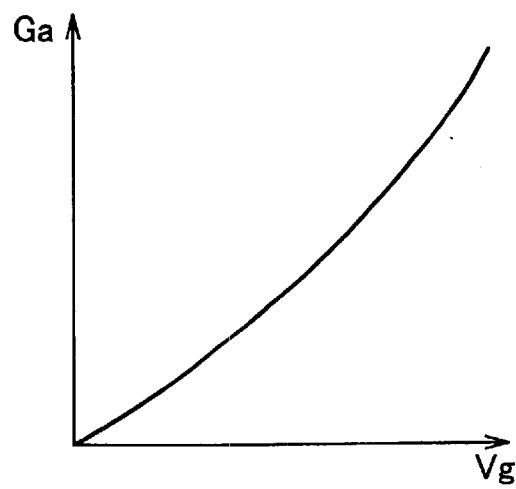
FIG. 2 is a graph (map) indicating the relationship between the output voltage of an airflow meter shown in FIG. 1 and an intake volume to be detected.

The airflow meter 61 outputs voltage Vg that changes in accordance with the mass flow rate of an intake air flowing in the intake pipe 41. FIG. 2 is a graph showing the relationship between the voltage Vg of the airflow meter 61 and the intake volume (intake flow rate) Ga to be detected. The throttle position sensor 62 detects the opening of the throttle valve 43 and outputs a signal indicative of a throttle valve opening TA. The cam position sensor 63 outputs a signal (G2 signal) which carries a single pulse every time the intake cam shaft rotates 90 degrees, namely every time the crankshaft 24 rotates 180 degrees. The crank position sensor 64 outputs a signal indicative of an engine speed NE which carries a narrow-width pulse every time the crankshaft 24 rotates 10 degrees, and which carries a wide-width pulse every time the crankshaft 24 rotates 360 degrees. The water temperature sensor 65 detects the coolant temperature of the internal combustion engine 10, and outputs a signal indicative of a coolant temperature THW.

Figure 3:
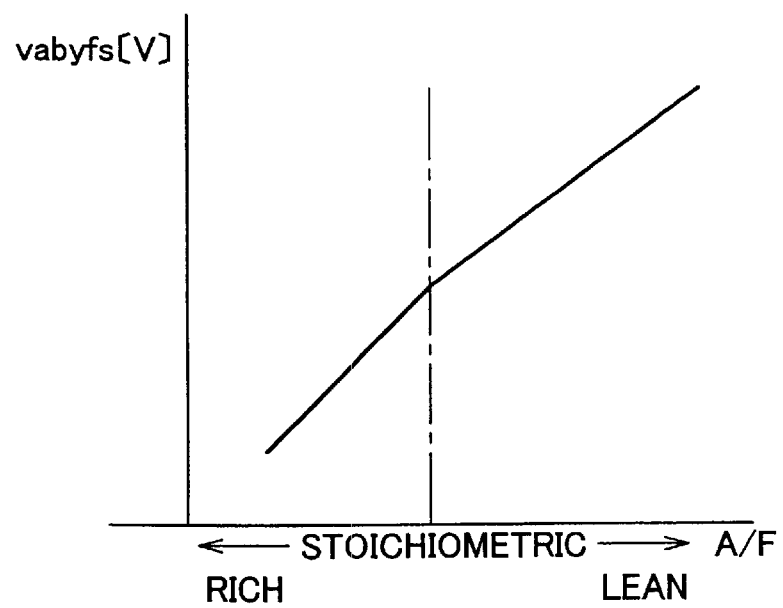
FIG. 3 is a graph (map) indicating the relationship between the output voltage of an upstream-side air-fuel ratio sensor shown in FIG. 1 and the air-fuel ratio.
Figure 4:
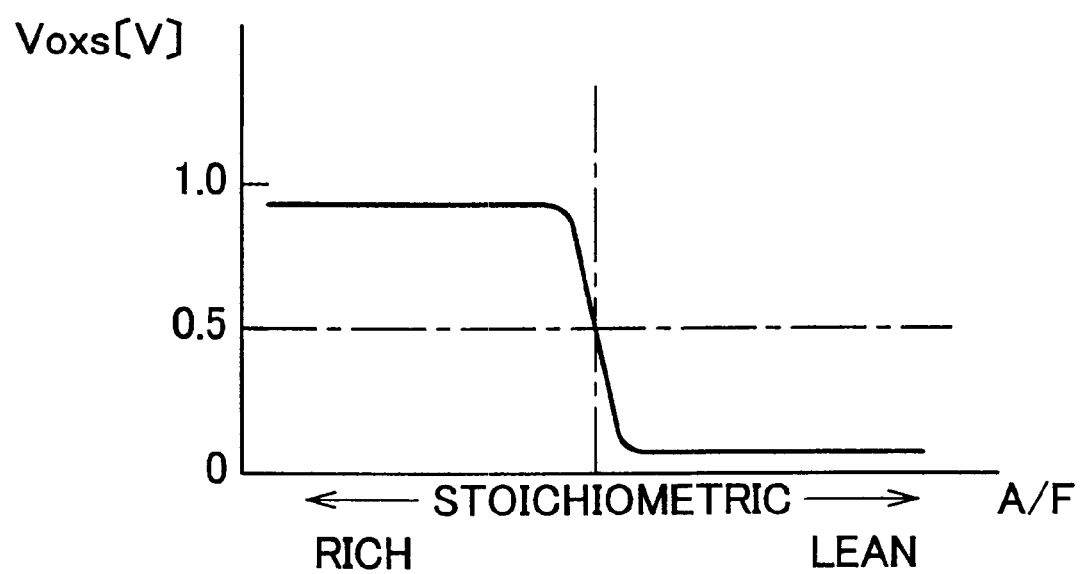
FIG. 4 is a graph (map) indicating the relationship between a downstream-side air-fuel ratio sensor shown in FIG. 1 and the air-fuel ratio.

The upstream-side air-fuel ratio sensor 66 is an oxygen sensor of a limiting current type. Referring to FIG. 3, the upstream-side air-furl ratio sensor 66 outputs current which changes in accordance with an air-fuel ratio A/F, and generates a voltage vabyfs corresponding to that current. The upstream-side air-fuel ratio sensor 66 is capable of accurately detecting the air-fuel ratio A/F in a wide range. Meanwhile, the downstream-side air-fuel ratio sensor 67 is an oxygen sensor of an electromotive force type (concentration cell type), and outputs a voltage Voxs which largely changes at the stoichiometric air-fuel ratio as shown in FIG. 4. More specifically, the downstream-side air-fuel ratio sensor 67 outputs about 0.1 V when the air-fuel ratio is lean of the stoichiometric air-fuel ratio, about 0.9 V when the air-fuel ratio is rich of the stoichiometric air-fuel ratio, and about 0.5 V when the air-fuel ratio is equal to the stoichiometric air-fuel ratio. The accelerator opening sensor 68 detects the amount that the accelerator pedal 81 is operated by an operator, and outputs a signal indicative of an operation amount Accp indicative of the operation amount of the accelerator pedal 81.

An electronic control unit 70 is a microcomputer including a CPU 71; a ROM 72 storing control routine programs to be executed by the CPU 71, operation tables (i.e., look-up tables, maps), constants, and the like; a RAM 73 into which the CPU 71 temporarily saves data; a back-up RAM 74 which saves data when being powered and maintains the data even after power has been shut off; an interface 75 including AD converters; and other components. The interface 75 is connected to the above-indicated sensors 61 to 68, and the CPU 71 receives the signals from those sensors via the interface 75. Also, the interface 75 provides, according to commands from the CPU 71, drive signals to the actuator 33a of the variable intake timing mechanism 33, the ignitor 38, the injector 39, the throttle valve actuator 43a, and the SCV actuator 44a.

Hereinafter, the outline on the air-fuel ratio control to be performed by the air-fuel ratio control system constructed as described above will be described.

As described above, if the air-fuel ratio has deviated from the stoichiometric air-fuel ratio to some extent, the resultant HC and CO, or NOx can be controlled by the catalyst 53 (and 54) having the oxygen storage capability aforementioned. More specifically, when the air-fuel ratio has become lean and the amount of NOx in the gas flowing into the first catalyst 53 has become large, the first catalyst 53 reduces NOx by removing oxygen therefrom and stores the oxygen thus removed. On the other hand, when the air-fuel ratio has become rich and the amount of HC and CO in the gas flowing into the first catalyst 53 has become large, the first catalyst 53 oxidizes HC and CO by passing the stored oxygen over to them.

Thus, for efficiently controlling a large amount of HC and CO continuously flowing into the first catalyst 53, it is required that a large amount of oxygen be stored in the first catalyst 53, whereas, for storing a large amount of NOx which continuously flows into the first catalyst 53, it is required that the first catalyst 53 have a sufficient free capacity for storing oxygen. This makes it clear that the gas purification capability of the first catalyst 53 depends on the maximum amount of oxygen storable in the first catalyst 53.

A three-way catalyst degrades due to poisoning by lead, sulfur, and the like, contained in fuel, and the heat applied to the catalyst, and the foregoing maximum storable oxygen amount gradually decreases as the degradation progresses. It is however desirable that the emissions from the internal combustion engine are appropriately controlled even when the maximum storable oxygen amount of the catalyst has become low. To achieve this, it is necessary to maintain the air-fuel ratio of the gas from the first catalyst 53 (i.e., the average air-fuel ratio of the gas flowing into the first catalyst 53) substantially equal to or extremely close to the stoichiometric air-fuel ratio.

According to the air-fuel ratio control system of the embodiment, therefore, a feedback control is performed on the air-fuel ratio of an air-fuel mixture to be supplied to the internal combustion engine 10 (will hereinafter be referred to as the "air-fuel ratio in the internal combustion engine 10" where appropriate) in accordance with the output Voxs of the downstream-side air-fuel ratio sensor 67 indicating the air-fuel ratio detected downstream of the first catalyst 53. More specifically, this feedback control is performed such that the output Voxs, a quantitative element indicating the state of the exhaust gas from the internal combustion engine 10, matches its target value Voxsref that is substantially equal to the stoichiometric air-fuel ratio. Here, considering that the air-fuel ratio in the internal combustion engine 10 and the air-fuel ratio of the gas detected upstream of the first catalyst 53 are equal to each other, the above-indicated feedback control may be regarded as being performed on the air-fuel ratio upstream of the first catalyst 53.

In this feedback control, when the air-fuel ratio detected by the downstream-side air-fuel ratio sensor 67 has become lean of the stoichiometric air-fuel ratio, a sub-feedback control amount vafsfb is determined through a proportional integration (i.e., PI control) of the deviation between the output Voxs of the downstream-side air-fuel ratio sensor 67 and the target value Voxsref which is substantially equal to the stoichiometric air-fuel ratio. Then, the output vabyfs of the upstream-side air-fuel ratio sensor 66 is corrected by the determined sub-feedback control amount vafsfb so that the air-fuel ratio in the internal combustion engine 10 appears to be lean of the air-fuel ratio actually detected by the upstream-side air-fuel ratio sensor 66.

Subsequently, a feedback correction amount DFi for correcting the amount of fuel to be supplied to the internal combustion engine 10 is calculated such that the foregoing apparent air-fuel ratio matches a target air-fuel ratio abyfr which is equal to the stoichiometric air-fuel ratio. Then, a basic injection amount Fbase, which is determined by dividing a value Mc indicating the volume of air to be introduced into the internal combustion engine during each intake stroke by the stoichiometric air-fuel ratio, is corrected using the determined feedback correction amount DFi.

Likewise, when the air-fuel ratio detected by the downstream-side air-fuel ratio sensor 67 has become rich of the stoichiometric air-fuel ratio, the sub-feedback control amount vafsfb is determined through a proportional integration (i.e., PI control) of the deviation between the output Voxs of the downstream-side air-fuel ratio sensor 67 and the target value Voxsref. Then, the output vabyfs of the upstream-side air-fuel ratio sensor 66 is corrected by the determined sub-feedback control amount vafsfb so that the air-fuel ratio in the internal combustion engine 10 appears to be rich of the air-fuel ratio actually detected by the upstream-side air-fuel ratio sensor 66. Then, the feedback control is performed such that the foregoing apparent air-fuel ratio matches the target air-fuel ratio abyfr. In this way, the feedback control is performed on the air-fuel ratio in the internal combustion engine 10.

As described above, the maximum storable oxygen amount of the catalyst gradually decreases as its degradation progresses. To cope with this, according to the embodiment, a maximum storable oxygen amount Cmax of the first catalyst 53 is estimated, and it is determined whether the maximum storable oxygen amount Cmax estimated is less than a threshold Th to judge if the first catalyst 53 has degraded. The following explains the procedure for calculating the maximum storable oxygen amount Cmax.

Figure 5:
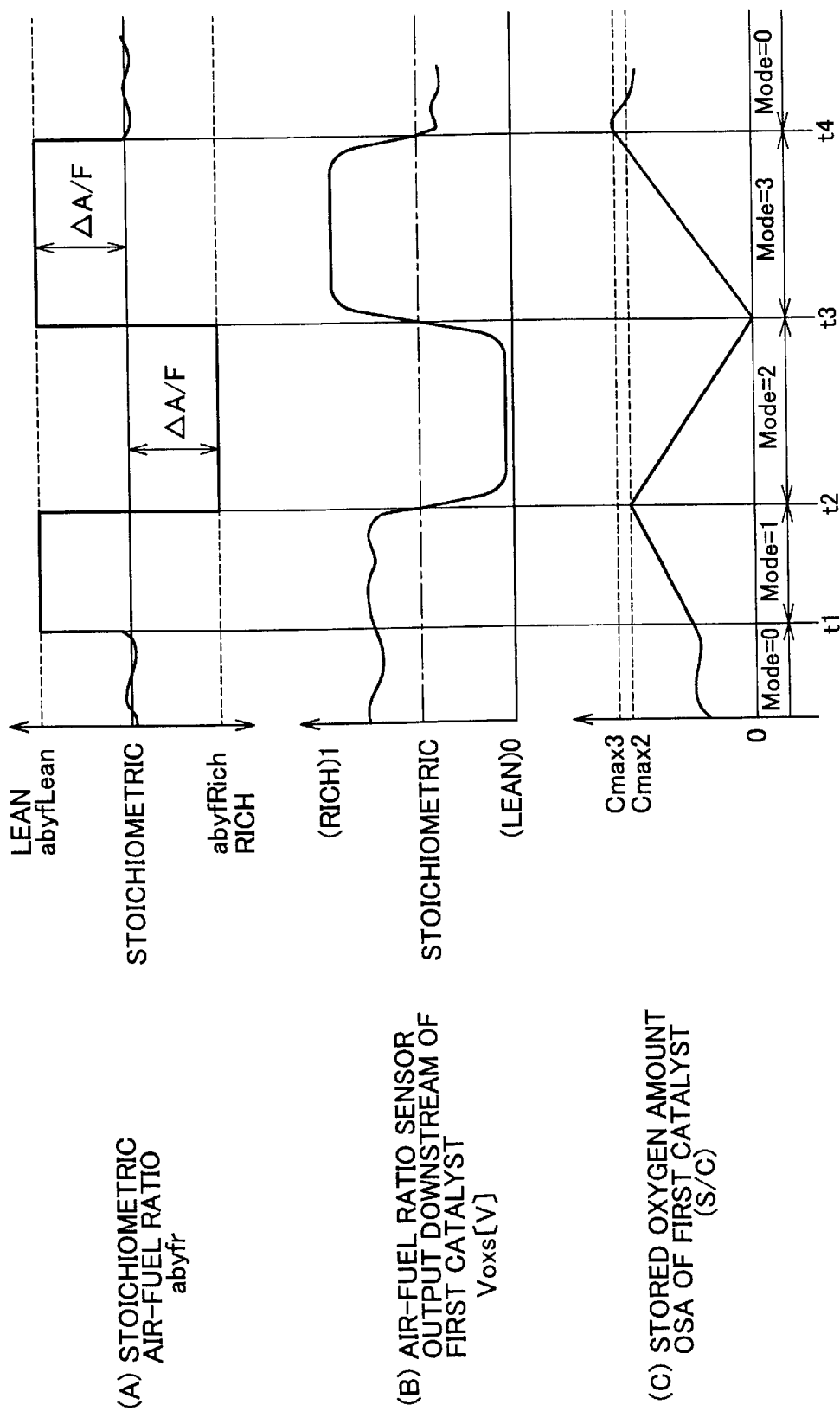
FIG. 5 is a timechart indicating changes in a target air-fuel ratio, the output of the downstream-side air-fuel ratio sensor, a stored oxygen amount of a first catalyst shown in FIG. 1 when determining the maximum storable oxygen amount of the first catalyst.

Referring to the time chart in FIG. 5, the above-described air-fuel ratio control continues until the time t1. Then, if it is determined at the time t1 that certain conditions for calculating the maximum storable oxygen amount have all been satisfied, the target air-fuel ratio abyfr of the gas upstream of the first catalyst 53 is set to a predetermined lean air-fuel ratio abyfLean so that the air-fuel ratio of the gas upstream of the first catalyst 53 becomes lean of the stoichiometric air-fuel ratio. Here, it is to be noted that, in this embodiment, one of the conditions for calculating the maximum storable oxygen amount Cmax requires that the air-fuel ratio detected by the downstream-side air-fuel ratio sensor 67 be presently rich of the stoichiometric air-fuel ratio.

Subsequently, the product of an air-fuel ratio setting coefficient K, which is the quotient of the stoichiometric air-fuel ratio divided by the predetermined lean air-fuel ratio abyfLean, and the basic injection amount Fbase is determined as a feed-forward fuel supply amount. Then, the feedback correction amount DFi for correcting the amount of fuel to be supplied to the internal combustion engine 10 is determined based on the air-fuel ratio actually detected by the upstream-side air-fuel ratio sensor 66 and the target air-fuel ratio abyfr. At this time, the feedback control amount DFi is calculated such that the air-fuel ratio actually detected by the upstream-side air-fuel ratio sensor 66 matches the target air-fuel ratio abyfr. Next, the feed-forward fuel supply amount (=K·Fbase) is corrected using the feedback correction amount DFi determined.

After the gas flowing into the first catalyst 53 has been made lean in the above manner, an stored oxygen amount OSA of the first catalyst 53 begins to increase gradually and reaches a maximum storable oxygen amount Cmax 2 at the time t2. At this time, therefore, a gas containing oxygen begins to flow out from the first catalyst 53, whereby the output Voxs of the downstream-side air-fuel ratio sensor 67 indicating a lean air-fuel ratio changes to indicate a rich air-fuel ratio. This operation mode from the time t1 to the time t2 will hereinafter be called a "first mode" (Mode=1).

When it is determined at the time t2 that the output Voxs of the downstream-side air-fuel ratio sensor 67 indicating a rich air-fuel ratio has changed to indicate a lean air-fuel ratio, the target air-fuel ratio abyfr of the gas upstream of the first catalyst 53 is set to the predetermined rich air-fuel ratio abyfRich.

Subsequently, the product of the air-fuel ratio setting coefficient K, which is the quotient of the stoichiometric air-fuel ratio divided by the predetermined rich air-fuel ratio abyfRich, and the basic injection amount Fbase is determined as the feed-forward fuel supply amount (=K·Fbase). Then, the feedback correction amount DFi for correcting the amount of fuel to be supplied to the internal combustion engine is determined such that the air-fuel ratio actually detected by the upstream-side air-fuel ratio sensor 66 matches the target air-fuel ratio abyfr. Next, the feed-forward fuel supply amount is corrected using the feedback correction amount DFi determined.

When the gas flowing into the first catalyst 53 has be made rich by the feedback control described above, the first catalyst 53 begins to release oxygen stored therein to oxidize unburned HC, CO entering the first catalyst 53 along with the gas, whereby the stored oxygen amount of the first catalyst 53 starts decreasing from the maximum storable oxygen amount Cmax 2. Afterwards, the stored oxygen amount OSA of the first catalyst 53 becomes zero at the time 3, which is when the output Voxs of the downstream-side air-fuel ratio sensor 67 indicating a lean air-fuel ratio changes to indicate a rich air-fuel ratio. This operation mode from the time t2 to the time t3 will hereinafter be called a "second mode" (Mode=2).

During the second mode, the maximum storable oxygen amount Cmax is estimated as the maximum storable oxygen amount Cmax2 in the following manner. First, a change amount $\Delta O2$ indicating a change in the amount of oxygen stored in the first catalyst 53 is calculated by an expressions 1 shown below $$\Delta O2 = 0.23 \cdot mfr \cdot (stoich - abyfs) \quad (1)$$

Then, the change amount $\Delta O2$ is accumulated from the time t2 to the time t3 to obtain the maximum storable oxygen amount Cmax2 by an expression 2 shown below $$Cmax2 = \Sigma \Delta O2 \quad (2)$$

Referring to the expression 1, "0.23" represents the weight ratio of oxygen contained in the ambient air, "mfr" represents the fuel injection amount Fi accumulated during a predetermined time period (i.e., a calculation cycle tsample), "stoich" represents the stoichiometric air-fuel ratio (e.g., 14.7), and "abyfs" represents the air-fuel ratio A/F detected by the upstream-side air-fuel ratio sensor 66 within the time period tsample. Alternatively, "abyfs" may be a value representing the average value of the air-fuel ratios A/F detected multiple times by the upstream-side air-fuel ratio sensor 66 during the time period tsample.

According to the expression 1, the shortage of air during the time period tsample is determined by multiplying the deviation of the detected air-fuel ratio A/F from the stoichiometric air-fuel ratio (stoich−abyfs) with the total injection amount mfr representing the total amount of fuel injected during the time period tsample. Then, the stored oxygen change amount $\Delta O2$, which represents a change in the amount of oxygen stored in the first catalyst 53 during the time period tsample, is obtained by multiplying the weight ratio of oxygen in the ambient air with the storage of air determined. The stored oxygen change amount $\Delta O2$ is accumulated from the time t2 to the time t3 to determine how much of oxygen stored in the first catalyst 53 has been consumed from when the first catalyst 53 was fulfilled by oxygen to its maximum capacity to when that stored oxygen has been completely used up. Then, the obtained amount of consumed oxygen is determined as the maximum storable oxygen amount Cmax2.

Alternatively, because the air-fuel ratio upstream of the first catalyst 53 is accurately controlled to the predetermined rich air-fuel ratio abyfRich, a predetermined constant rich air-fuel ratio, from the time t2 to the time t3, the maximum storable oxygen amount Cmax2 can be easily obtained by the following expression $$Cmax2 = 0.23 \cdot mfr2 \cdot (stoich - abyfRich) \cdot \Delta t2$$

where "$\Delta t2$" represents the time period from the time t1 to the time t2, and "mfr2" represents the amount of fuel to be supplied per unit time during the time period $\Delta t2$.

When it is determined at the time t3 that the output Voxs of the downstream-side air-fuel ratio sensor 67 indicating a lean air-fuel ratio has changed to indicate a rich air-fuel ratio, the target air-fuel ratio abyfr of the gas upstream of the first catalyst 53 is set to the predetermined lean air-fuel ratio abyfLean.

Subsequently, the product of the air-fuel ratio setting coefficient K, which is the quotient of the stoichiometric air-fuel ratio divided by the predetermined lean air-fuel ratio abyfLean, and the basic injection amount Fbase is determined as the feed-forward fuel supply amount (=K·Fbase). Then, the feedback correction amount DFi for correcting the amount of fuel to be supplied to the internal combustion engine is determined such that the air-fuel ratio actually detected by the upstream-side air-fuel ratio sensor 66 matches the target air-fuel ratio abyfr. Next, the feed-forward fuel supply amount is corrected using the feedback correction amount DFi determined.

When the gas flowing into the first catalyst 53 has been made lean by the feedback control described above, the stored oxygen amount OSA of the first catalyst 53, which is presently zero, begins to increase from the time t3, and reaches a maximum storable oxygen amount Cmax3 at the time t4. Thus, a gas of a lean air-fuel ratio containing oxygen starts flowing out from the first catalyst 53 at the time t4, and the output Voxs of the downstream-side air-fuel ratio sensor 67 indicating a rich air-fuel ratio changes to indicate a lean air-fuel ratio at the same time. This operation mode from the time t3 to the time t4 will hereinafter be called a "third mode" (Mode=3).

During the third mode, the maximum storable oxygen amount Cmax is estimated as the maximum storable oxygen amount Cmax3 in the following manner. Note that the stored oxygen amount OSA is zero at the time t3, and reaches the maximum storable oxygen amount Cmax3 at the time t4. First, as in the case of the second mode, the change amount $\Delta O2$ is calculated by an expressions 3 shown below $$\Delta O2 = 0.23 \cdot mfr \cdot (abyfs - stoich) \quad (3)$$

Then, the obtained change amount $\Delta O2$ is accumulated from the time t3 to the time t4 to obtain the maximum storable oxygen amount Cmax3 by an expression 4 shown below $$Cmax3 = \Sigma \Delta O2 \quad (4)$$

According to the expression 3, the excessive volume of air during the time period tsample is determined by multiplying the total injection amount mfr with the deviation of the detected air-fuel ratio A/F from the stoichiometric air-fuel ratio (abyfs–stoich), and the stored oxygen change amount $\Delta O2$ during the time period tsample is determined by multiplying the weight ratio of oxygen with the excessive volume of air determined. Then, the stored oxygen change amount $\Delta O2$ is accumulated from the time t3 to the time t4 by the expression 4, thus the amount of oxygen which has been stored in the first catalyst 53 from when the stored oxygen amount of the first catalyst 53 was zero to when the first catalyst 53 has stored oxygen to its maximum capacity is obtained. The obtained amount of stored oxygen is then determined as the maximum storable oxygen amount Cmax3.

In this case, too, because the air-fuel ratio upstream of the first catalyst 53 is accurately controlled to the rich air-fuel ratio abyfLean, a predetermined constant lean air-fuel ratio, from the time t3 to the time t4, the maximum storable oxygen amount Cmax3 can be easily obtained by the following expression $$Cmax3 = 0.23 \cdot mfr3 \cdot (abyfLean - stoich) \cdot \Delta t3$$

where "$\Delta t3$" represents the time period from the time t3 to the time t4, and "mfr3" represents the amount of fuel to be supplied per unit time during the time period $\Delta t3$.

Subsequently, the normal air-fuel ratio control resumes at the time t4, resetting the air-fuel ratio of the air-fuel mixture to be supplied to the internal combustion engine 10 to the stoichiometric air-fuel ratio. In the meantime, the average value of the respective maximum storable oxygen amounts Cmax2 and Cmax3 is calculated as the maximum storable oxygen amount Cmax. Thus, the maximum storable oxygen amount Cmax of the first catalyst 53 is determined. According to the embodiment, the maximum storable oxygen amount Cmax is calculated in the above-described manner for CNth times, and its average value is determined as an average maximum storable oxygen amount Cmaxave. If the maximum storable oxygen amount Cmaxave is less than a threshold, it is determined that the first catalyst 53 has degraded.

As described above, with the air-fuel ratio control system of the embodiment, the degradation of the catalyst is determined on the basis of the maximum storable oxygen amount Cmax. For determining the maximum storable oxygen amount Cmax, the target air-fuel ratio abyfr is set to the predetermined rich air-fuel ratio abyfRich which is rich of the stoichiometric air-fuel ratio when it is determined that the air-fuel ratio detected by the downstream-side air-fuel ratio sensor 67 indicating a rich air-fuel ratio has changed to indicate a lean air-fuel ratio, whereas the target air-fuel ratio abyfr is set to the predetermined lean air-fuel ratio abyfLean that is lean of the stoichiometric air-fuel ratio when it is determined that the air-fuel ratio detected by the downstream-side air-fuel ratio sensor 67 indicating a lean air-fuel ratio has changed to indicate a rich air-fuel ratio. Thereafter, the feedback correction amount DFi is determined such that the air-fuel ratio detected by the upstream-side air-fuel ratio sensor 66 matches the target air-fuel ratio abyfr.

Also, when it is determined that the target air-fuel ratio has been switched from the predetermined rich air-fuel ratio abyfRich to the predetermined lean air-fuel ratio abyfLean, or from the predetermined lean air-fuel ratio abyfLean to the lean air-fuel ratio abyfRich, the feed-forward fuel supply amount is obtained by multiplying the basic injection amount Fbase, an injection amount theoretically required for achieving the stoichiometric air-fuel ratio, with an air-fuel ratio setting coefficient K determined by dividing the stoichiometric air-fuel ratio by the target air-fuel ratio abyfr which has just been switched as aforementioned. Subsequently, the obtained feed-forward fuel supply amount (K·Fbase) is corrected using the feedback correction amount DFi.

That is, according to the embodiment, the feed-forward fuel supply amount is calculated irrespective of the outputs of the first and second air-fuel ratio sensors 66, 67, based on the in-cylinder intake volume Mc and the target air-fuel ratio abyfr so as to attain a fuel supply amount required for achieving a certain rich air-fuel ratio, when it is determined that the target air-fuel ratio abyfr has been switched from the predetermined lean air-fuel ratio abyfLean to the predetermined rich air-fuel ratio abyfRich. While the feed-forward fuel supply amount is set to a fuel supply amount theoretically required for the air-fuel ratio upstream of the first catalyst 53 to match the predetermined rich air-fuel ratio abyfRich, the feed-forward fuel supply amount is not necessarily set in such a manner, but it may be set to, for example, a specific amount that is sufficient for changing the air-fuel ratio upstream of the first catalyst 53 to change from a lean air-fuel ratio to a rich air-fuel ratio immediately.

Likewise, when the target air-fuel ratio abyfr has changed from the predetermined rich air-fuel ratio abyfRich to the predetermined lean air-fuel ratio abyfLean, the feed-forward fuel supply amount is calculated irrespective of the outputs of the first and second air-fuel ratio sensors 66, 67, based on the in-cylinder intake volume Mc and the target air-fuel ratio abyfr so as to attain a fuel supply amount required for achieving a certain lean air-fuel ratio. While the feed-forward fuel supply amount is set to a fuel supply amount theoretically required for the air-fuel ratio upstream of the first catalyst 53 to match the predetermined lean air-fuel ratio abyfLean, the feed-forward fuel supply amount is not necessarily set in such a manner, but it may be set to, for example, a specific amount that is sufficient for changing the air-fuel ratio upstream of the first catalyst 53 to change from a rich air-fuel ratio to a lean air-fuel ratio immediately.

In this way, the air-fuel ratio upstream of the first catalyst 53 is made equal to the target air-fuel ratio abyfr immediately after the target air-fuel ratio abyfr has been switched between the predetermined lean air-fuel ratio abyfLean and the predetermined rich air-fuel ratio abyfRich. Thus, even if there is a delay in the control owing to the feedback correction amount DFi, the emissions do not largely increase. That is, if the basic fuel injection amount for achieving the stoichiometric air-fuel ratio is corrected using the feedback correction amount DFi and the air-fuel ratio upstream of the first catalyst 53 is controlled to a target rich or lean air-fuel ratio as in the case of conventional air-fuel ratio control systems, it takes a long period of time for the feedback correction amount DFi to reach a target level, namely it takes a long period of time for the air-fuel ratio to reach the target air-fuel ratio, so the emissions largely increase. This increase in the emission is particularly intense until the catalyst-upstream air-fuel ratio has become above or below the stoichiometric air-fuel ratio after switching the target air-fuel ratio. According to the air-fuel ratio control system of the embodiment, however, such an increase in the emissions does not occur.

Figure 6:
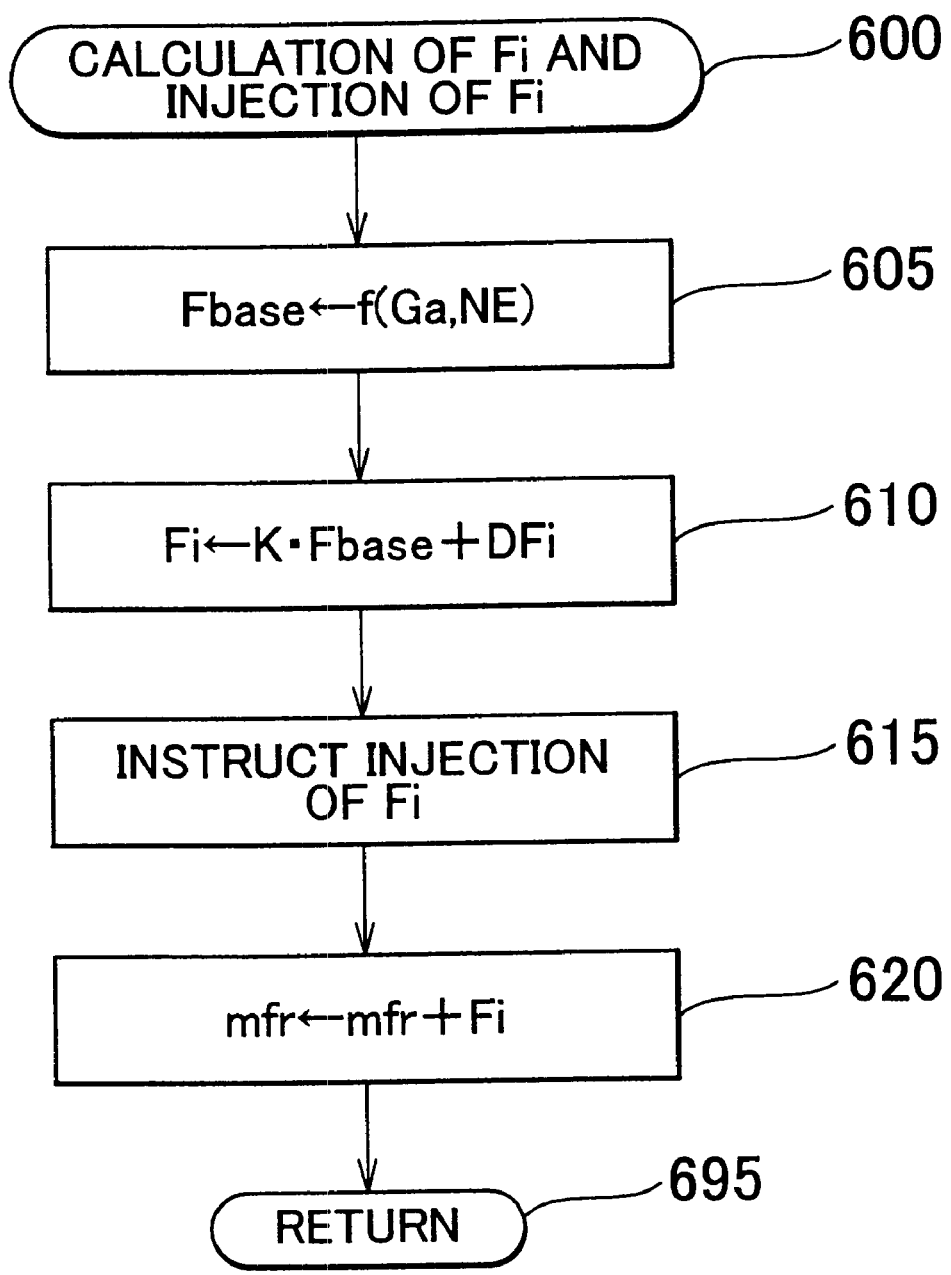
FIG. 6 is a flowchart showing a routine to be executed by a CPU shown in FIG. 1 for calculating the amount of fuel to be injected.

Hereinafter, the actual operation of the air-fuel ratio control system of the embodiment will be described. FIG. 6 shows a routine for calculating a final fuel injection amount Fi and instructing fuel injections. This routine is repeatedly executed by the CPU 71 every time the crank angle reaches a predetermined angle before the top dead center (e.g., BTDC 90° CA) during an intake stroke in each cylinder. That is, when the crank angle reaches the predetermined angle, the routine starts from step S600. First, the CPU 71 determines in step S605 the basic fuel injection amount Fbase for achieving the stoichiometric air-fuel ratio based on the intake volume Ga detected by the airflow meter 61 and the engine speed NE. More specifically, the in-cylinder intake volume Mc is calculated by dividing a first-order delayed value of the intake volume Ga by the engine speed NE, and the basic fuel injection amount Fbase is determined by a function f dividing the calculated in-cylinder intake volume MC by the stoichiometric air-fuel ratio as the target air-fuel ratio. Here, note that, by calculating the in-cylinder intake volume Mc in the above manner, the CPU 71 serves as "intake volume obtaining means" in the invention.

Next, the CPU 71 proceeds to step S610 where the final fuel injection amount Fi is set to the sum of the feedback correction amount (main feedback control amount) DFi, which will be described later, and the product of the air-fuel ratio setting coefficient K and the basic injection amount Fbase (i.e., feed-forward fuel supply amount=K·Fbase). The setting coefficient K is normally 1.00, but is changed to a value obtained by dividing the stoichiometric air-fuel ratio by the present target air-fuel ratio abyfr when changing the air-fuel ratio for determining the maximum storable oxygen amount Cmax.

Subsequently in step S615, the CPU 71 instructs the injector 39, serving as a part of "fuel supplying means" in the invention, to inject the same amount of fuel as the final fuel injection amount Fi. The CPU 71 then proceeds to step S620 to update the total injection amount mfr by adding the final fuel injection amount Fi, after which the routine ends in step S695. The total injection amount mfr is used for calculating the amount of oxygen stored in the first catalyst 53, as described later. Thus, the final fuel injection amount Fi is corrected, and the same amount of fuel is injected into the cylinder when the piston begins the intake stroke in each cylinder.

Figure 7:
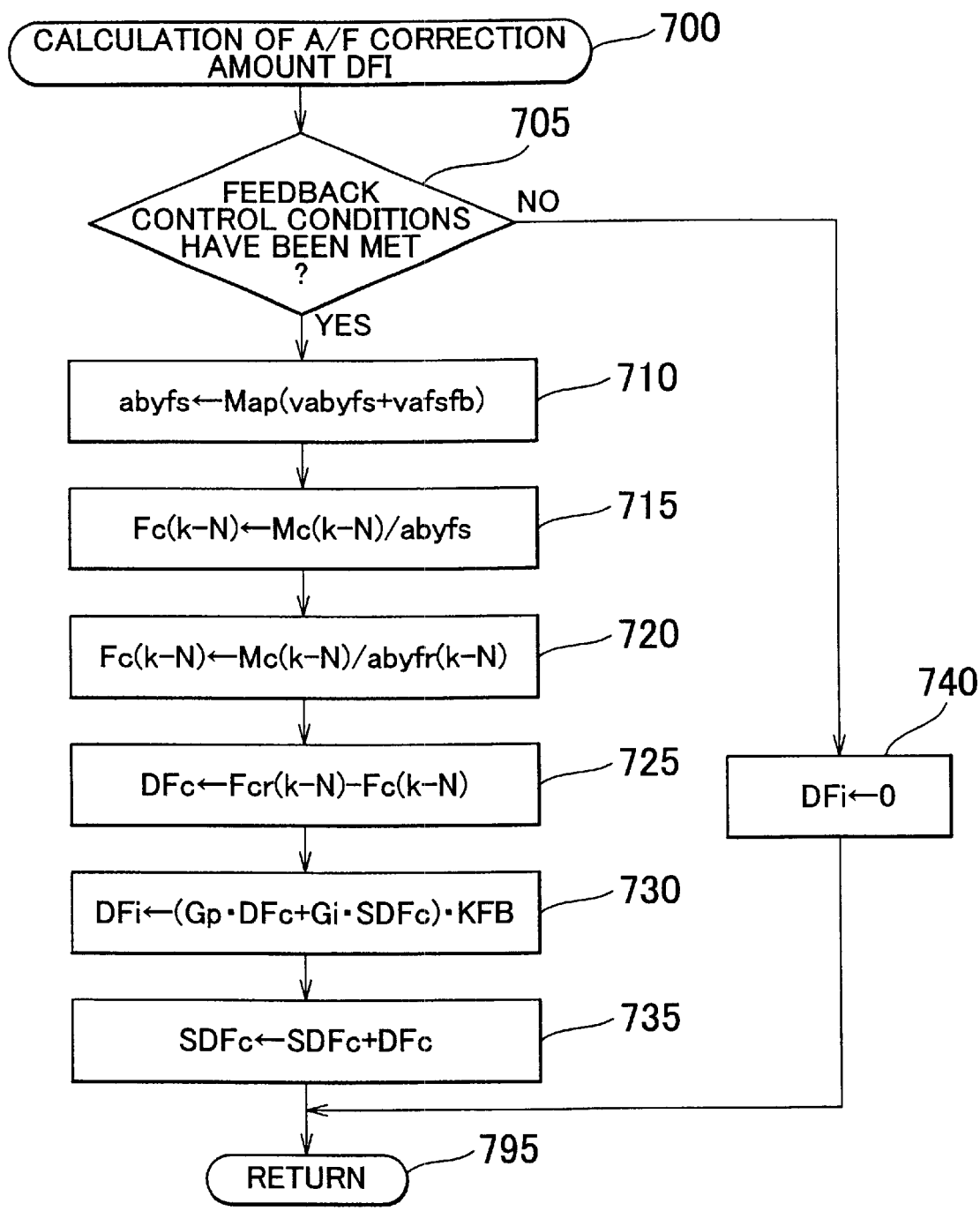
FIG. 7 is a flowchart showing a routine to be executed by the CPU for calculating a feedback correction amount.

Next, the procedure for calculating the main feedback correction amount DFi will be described. FIG. 7 is a flowchart showing a routine for calculating the main feedback correction amount DFi. This routine is repeatedly executed by the CPU 71 at predetermined time intervals. Referring to FIG. 7, the CPU 71 starts the routine from step S700. First, the CPU 71 determines in step S705 whether air-fuel ratio feedback control conditions (main feedback control conditions) have all been satisfied. For example, these conditions respectively require that the coolant temperature THW be higher than a first temperature, that the intake volume (load, in-cylinder intake volume Mc) obtained every time the crankshaft rotates once be equal to or smaller than a predetermined value, and that the upstream-side air-fuel ratio sensor 66 be in a normal operation state.

When all the air-fuel ratio feedback control conditions have all been satisfied, the CPU 71 judges "Yes" in step S705, and proceeds to step S710. In step S710, the present value of a main feedback control air-fuel ratio abyfs is determined by converting the sum of the output vabyfs of the upstream-side air-fuel ratio sensor 66 and the sub-feedback control amount vafsfb (vabyfs+vafsfb) based on the map shown in FIG. 3. Thus, the main feedback control air-fuel ratio abyfs is the apparent air-fuel ratio upstream of the first catalyst 53 that is obtained by correcting the output of the upstream-side air-fuel ratio sensor 66 by the sub-feedback control amount vafsfb as aforementioned.

Subsequently, in step S715, an actual in-cylinder fuel supply amount Fc (k–N) injected N strokes before the present is determined by dividing the in-cylinder intake volume Mc (k–N), which indicates the intake volume during an intake stroke performed N intake strokes before the present, by the main feedback control air-fuel ratio abyfs determined as aforementioned. Note that the value "N" varies in accordance with the size of the internal combustion engine, the distance from the combustion chamber 25 to the upstream-side air-fuel ratio sensor 66, and so on.

In this routine, the in-cylinder intake volume Mc (k–N) is divided by the main feedback control air-fuel ratio abyfs in the process of determining the in-cylinder fuel supply amount Fc (k–N) injected N strokes before the present. This is because it takes a time as long as N times of piston strokes before an air-fuel mixture reaches the upstream-side air-fuel ratio sensor 66 after burnt within the combustion chamber 25. Here, it is to be noted that the in-cylinder intake volume Mc is saved in the RAM 73 at a time corresponding to the intake stroke.

Next, the CPU 71 proceeds to step S720 where a target in-cylinder fuel supply amount Fcr (k–N) is determined by dividing the in-cylinder intake volume Mc (k–N) by the target air-fuel ratio abyfr (k–N) employed N strokes before the present. Here, the target air-fuel ratio abyfr is also saved in the RAM 73 at time corresponding to the intake stroke.

Thereafter, the CPU 71 proceeds to step S725 where an in-cylinder fuel supply amount deviation DFc is determined by subtracting the in-cylinder fuel supply amount Fc (k–N) from the target in-cylinder fuel supply amount Fcr (k–N). That is, the in-cylinder fuel supply amount deviation DFc represents the excessive or insufficient amount of fuel supplied into the cylinder N strokes before the present. Then, the CPU 71 proceeds to step S730 to determine the feedback correction amount DFi by an expression 5 shown below $$DFi = (Gp \cdot DFc + Gi \cdot SDFc) \cdot KFB \qquad (5)$$

where "Gp" is a predetermined proportional gain (i.e., a predetermined proportional constant), "Gi" is a predetermined integral gain (i.e., a predetermined integral constant), "KFB" is a coefficient which is set to 1 in this embodiment, and "SDFc" is an integral value of the in-cylinder fuel supply amount deviation DFc. Note that it is preferable that the coefficient KFB be a value which changes in accordance with the engine speed NE, the in-cylinder intake air amount Mc, and so on. Then, the CPU 71 updates the integral value SDFc by adding the in-cylinder fuel supply amount deviation DFc determined in step S725, after which the routine ends in step S795.

Thus, the feedback correction amount DFi is determined through the proportional integration described above, and the determined main feedback correction amount DFi is reflected to the fuel injection amount in step S610 of the routine shown in FIG. 6, which compensates for the excess or insufficiency in the actual fuel supply amount injected N strokes before the present. Thus, the feedback control on the air-fuel ratio in the internal combustion engine is performed so that it becomes substantially equal to the target air-fuel ratio abyfr.

Conversely, If the CPU 71 therefore judges "No" in step S705 determining that the air-fuel ratio feedback control conditions have not all been satisfied, the feedback correction amount DFi is set to 0 in step S740, after which the routine ends in step S795. Namely, if it is determined that the air-fuel ratio feedback control conditions have not all been satisfied, the correction of the air-fuel ratio (feed-forward fuel supply amount=K·Fbase) is not carried out, setting the feedback correction amount DFi to 0.

Next, the air-fuel ratio feedback control based on the output Voxs of the downstream-side air-fuel ratio sensor 67 (sub-feedback control) will be described. In this control, the sub-feedback control amount vafsfb is calculated.

Figure 8:
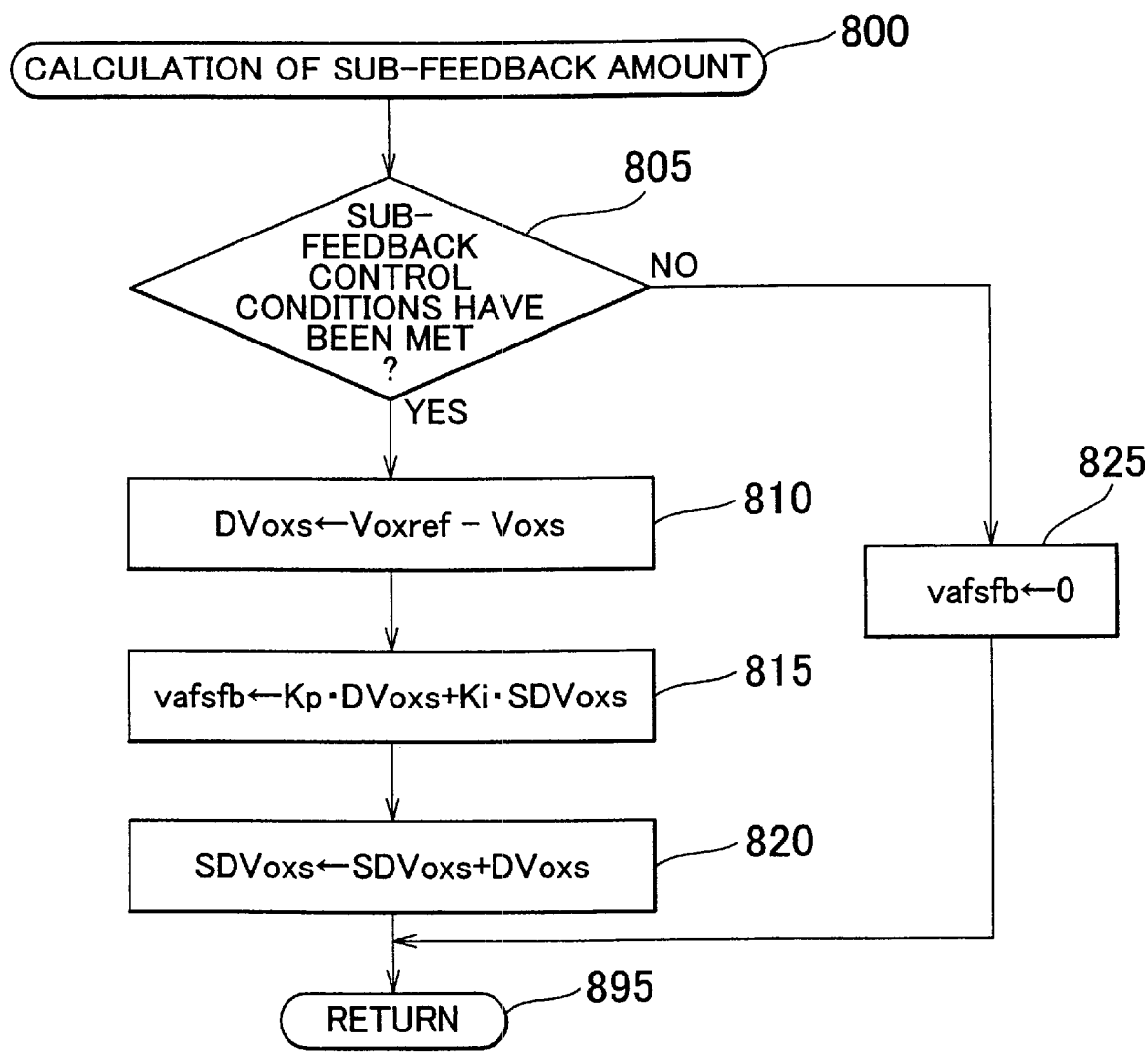
FIG. 8 is a flowchart showing a routine to be executed by the CPU for calculating a sub-feedback control amount.

FIG. 8 is a flowchart showing a routine for determining the sub-feedback control amount vafsfb that is repeatedly executed by the CPU 71 at predetermined time intervals. Referring to FIG. 8, the CPU 71 starts at a specific time the routine from step S800, and proceeds to step S805 to determine whether sub-feedback control conditions have all been satisfied. For example, these conditions respectively require that the air-fuel ratio feedback control conditions have been satisfied, that the coolant temperature THW be equal to or greater than a second temperature which is higher than the first temperature, and that a flag XHAN be 0.

The flag XHAN indicates whether an air-fuel ratio control for calculating the maximum storable oxygen amount Cmax, to be described later, is being performed. This flag is set to "1" when the control is being performed, and is set to "0" when it is not being performed.

When the sub-feedback control conditions have been all satisfied, the CPU 71 judges "Yes" in step S805, and proceeds to step S810 where an output deviation Dvoxs is determined by subtracting the output Voxs of the downstream-side air-fuel ratio sensor 67 from the target value Voxref, to be set to a value corresponding to the stoichiometric air-fuel ratio. Then, the CPU 71 determines in step S815 the sub-feedback control amount vafsfb by an expression 6 shown below $$vafsfb=Kp \cdot Dvoxs+Ki \cdot SDVoxs \qquad (6)$$

where "Kp" is a predetermined proportional gain (i.e., a predetermined proportional constant), "Ki" is a predetermined integral gain (i.e., a predetermined integral constant), and "SDVoxs" is an integral value of the output deviation Dvoxs. In step S820, the CPU 71 updates the integral value SDVoxs by adding the output deviation Dvoxs determined in step S810, after which the routine ends in step S895.

In this way, the sub-feedback control amount vafsfb is determined, and the determined sub-feedback control amount vafsfb is added to the actual output vabyfs of the upstream-side air-fuel ratio sensor 66 in step S710. The sum (i.e., vabyfs+vafsfb) is then converted to the main feedback control air-fuel ratio abyfs based on the map of FIG. 3 stored in the ROM 72. Thus, the main feedback control air-fuel ratio abyfs is set, based on the output Voxs of the downstream-side air-fuel ratio sensor 67, to a specific air-fuel ratio that is different from the actual air-fuel ratio indicated by the output vabyfs of the upstream-side air-fuel ratio sensor 66 by an amount corresponding to the sub-feedback control amount vafsfb.

Thus the in-cylinder fuel supply amount Fe (k-N-) calculated in step S715 in FIG. 7 changes in accordance with the output Voxs of the downstream-side air-fuel ratio sensor 67, whereby the feedback correction amount DFi to be determined through steps S725 and S730 changes in accordance with the output Voxs of the downstream-side air-fuel ratio sensor 67. In this way, the air-fuel ratio in the internal combustion engine 10 is controlled such that the air-fuel ratio downstream of the first catalyst 53 matches the air-fuel ratio indicated by the target value Voxsref.

If it is determined that any one or more of the sub-feedback control conditions has not yet been satisfied, conversely, the CPU 71 judges "No" in step S805, and proceeds to step S825 to set the sub-feedback control amount vafsfb to 0, after which the routine ends in step S895.

The following explains the actual operation procedures executed for calculating the maximum storable oxygen amount Cmax of the first catalyst 53 and determining the degradation of the same catalyst 53. The CPU 71 repeatedly executes each of the routines shown in FIGS. 9 to 16 at predetermined time intervals.

Figure 9:
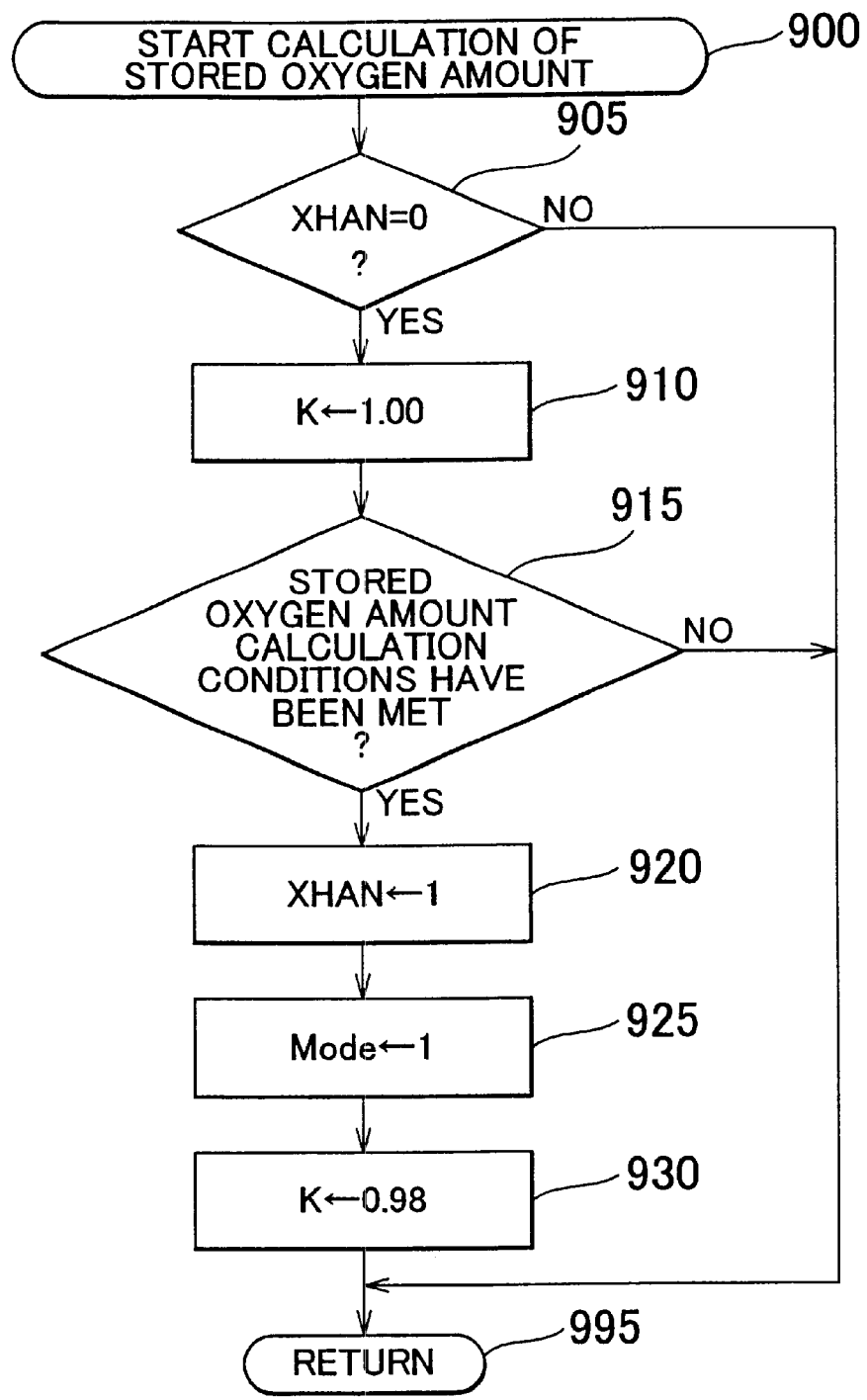
FIG. 9 is a flowchart showing a routine to be executed by the CPU for determining whether to start the calculation of the stored oxygen amount.

First of all, the CPU 71 starts at a specific time the routine shown in FIG. 9 from step S900 for determining whether to start the calculation of the stored oxygen amount. Referring to FIG. 9, the CPU 71 first determines in step S905 whether the flag XHAN is 0.

Here, if the flag XHAN is 0 since any one or more of maximum storable oxygen amount calculation conditions (i.e., catalyst degradation determination conditions) have not yet been satisfied, namely the air-fuel ratio control for calculating the maximum storable oxygen amount Cmax is not underway, the CPU 71 judges "Yes" in step S905. Then, the setting coefficient K, to be used in step S610 in FIG. 9, is set to 1.00 in step S910.

Subsequently, the CPU 71 determines in step S915 whether the maximum storable oxygen amount calculation conditions have been all satisfied. For example, the conditions respectively require that the coolant temperature THW be equal to or higher than a predetermined temperature, that the vehicle speed detected by a vehicle speed sensor (not shown) be higher than a predetermined speed, and that the amount of change in an opening TA of the throttle valve per unit time be equal to or smaller than a predetermined amount. That is, these conditions are all satisfied when the internal combustion engine is running in the normal state.

Also, the maximum storable oxygen amount calculation conditions may further include selected one or more of conditions respectively requiring that an estimated temperature of the first catalyst 53 be within a predetermined range, that a predetermined time have passed since the maximum storable oxygen amount was calculated the last time, that the vehicle have run further than a predetermined distance since the maximum storable oxygen amount was calculated the last time, and that the internal combustion engine 10 have operated longer than a predetermined time since the maximum storable oxygen amount was calculated the last time. Back to the routine, if it is determined that the maximum storable oxygen amount conditions have not been all satisfied, the CPU 71 judges "No" in step S915, after which the routine ends in step S995.

Here, it is presumed that the maximum storable oxygen amount calculation conditions are all satisfied in a state, as that at the time t1 in FIG. 5, where the air-fuel ratio control for calculating the maximum storable oxygen amount has not been performed so far, namely the foregoing normal air-fuel ratio control has been underway so far. Then, the CPU 71 judges "Yes" in step S905, and proceeds to step S910 to set the setting coefficient K to 1.00. Subsequently, the flag XHAN is set to 1 in step S920.

Next, "Mode" is set to "1" in step S925, and the setting coefficient K is set to 0.98 in step S930, after which the routine ends in step S995.

Figure 10:
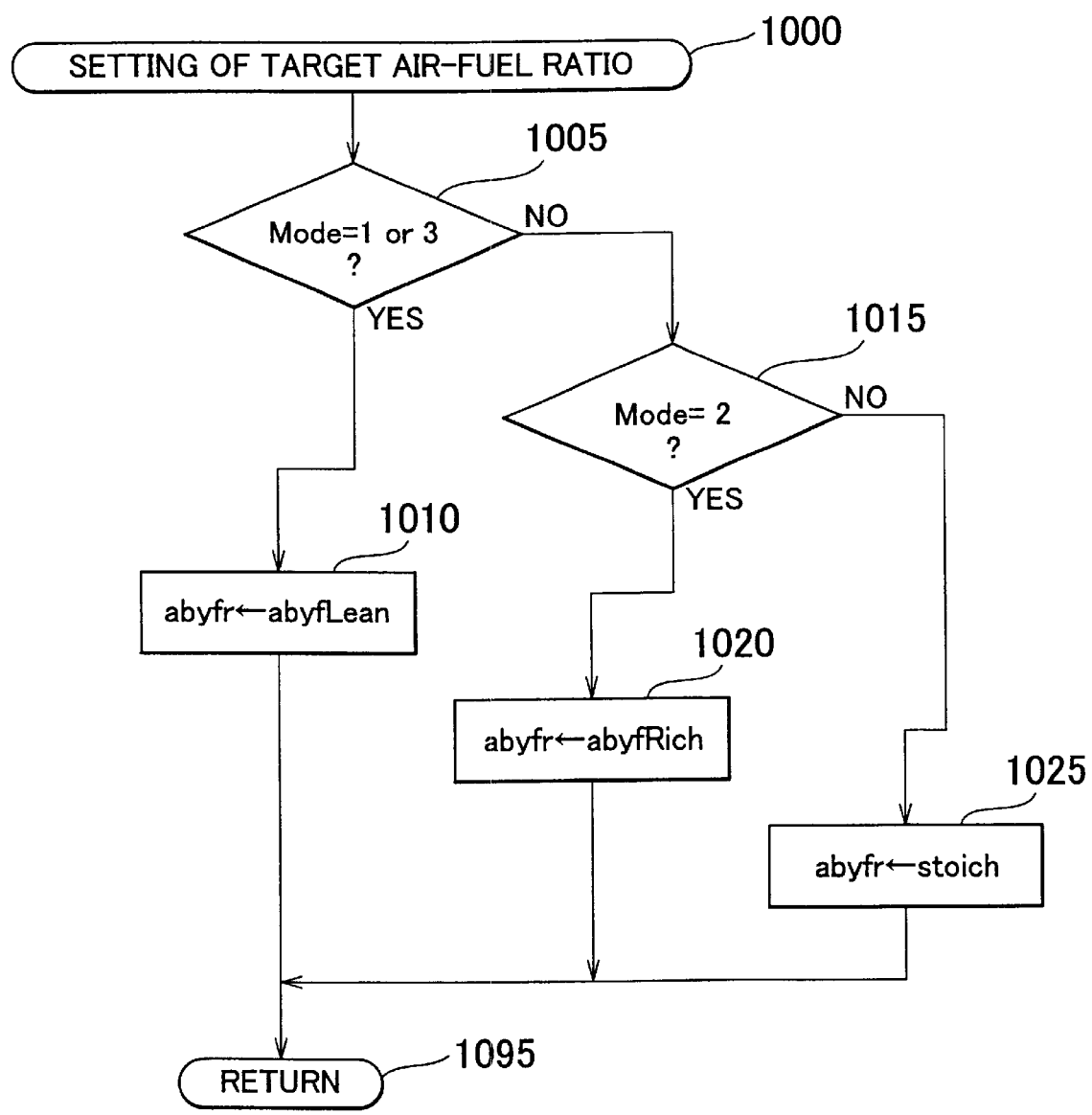
FIG. 10 is a flowchart showing a routine to be executed by the CPU for setting the target air-fuel ratio.

Also, the CPU 71 repeatedly executes a routine shown in FIG. 10 for setting a target air-fuel ratio at predetermined time intervals. Referring to FIG. 10, the CPU 71 starts the routine from step S1000, and determines whether "Mode" is 1 or 3 in step S1005.

At this time, because "Mode" was set to 1 in step S925 as aforementioned, the CPU 71 judges "Yes" in step S1005, and proceeds to step S1010 to set the target air-fuel ratio abyfr to the predetermined lean air-fuel ratio abyfLean, after which the routine ends in step S1095. Here, note that the quotient of the stoichiometric air-fuel ratio divided by the predetermined lean air-fuel ratio abyfLean is equal to the setting coefficient K set in step S930.

As a result of the above, the flag XHAN is set to 1 in step S920, and the CPU 71 determines that the sub-feedback control conditions have not been all satisfied. Thus, the CPU 71 judges "No" in step S805 during the routine shown in FIG. 8, and proceeds to step S825 to set the sub-feedback control amount vafsfb to 0, whereby the sub-feedback control stops.

On the other hand, the feedback correction amount DFi is calculated based on the output vabyfs and the target air-fuel ratio abyfr such that the air-fuel ratio upstream of the first catalyst 53 becomes equal to the predetermined lean air-fuel ratio abyfLean in the above-described main feedback control which is continued by repeatedly executing the routine shown in FIG. 7. Then, the final fuel injection amount Fi is calculated in step S610 in FIG. 6 by adding the feedback correction amount DFi to the feed-forward fuel supply amount that is the product of the basic injection amount Fbase and 0.98 (i.e., coefficient K), and the same amount of fuel as the final fuel injection amount Fi calculated is injected. Thus, the air-fuel ratio in the internal combustion engine is immediately controlled to the predetermined lean air-fuel ratio abyfLean that is lean of the stoichiometric air-fuel ratio.

After this, the CPU 71 repeats the routine of FIG. 9 from step S900. However, because the flag XHAN has been set to 1 as aforementioned, the CPU 71 judges "No" in step S905 and the routine ends in step S995.

Figure 11:
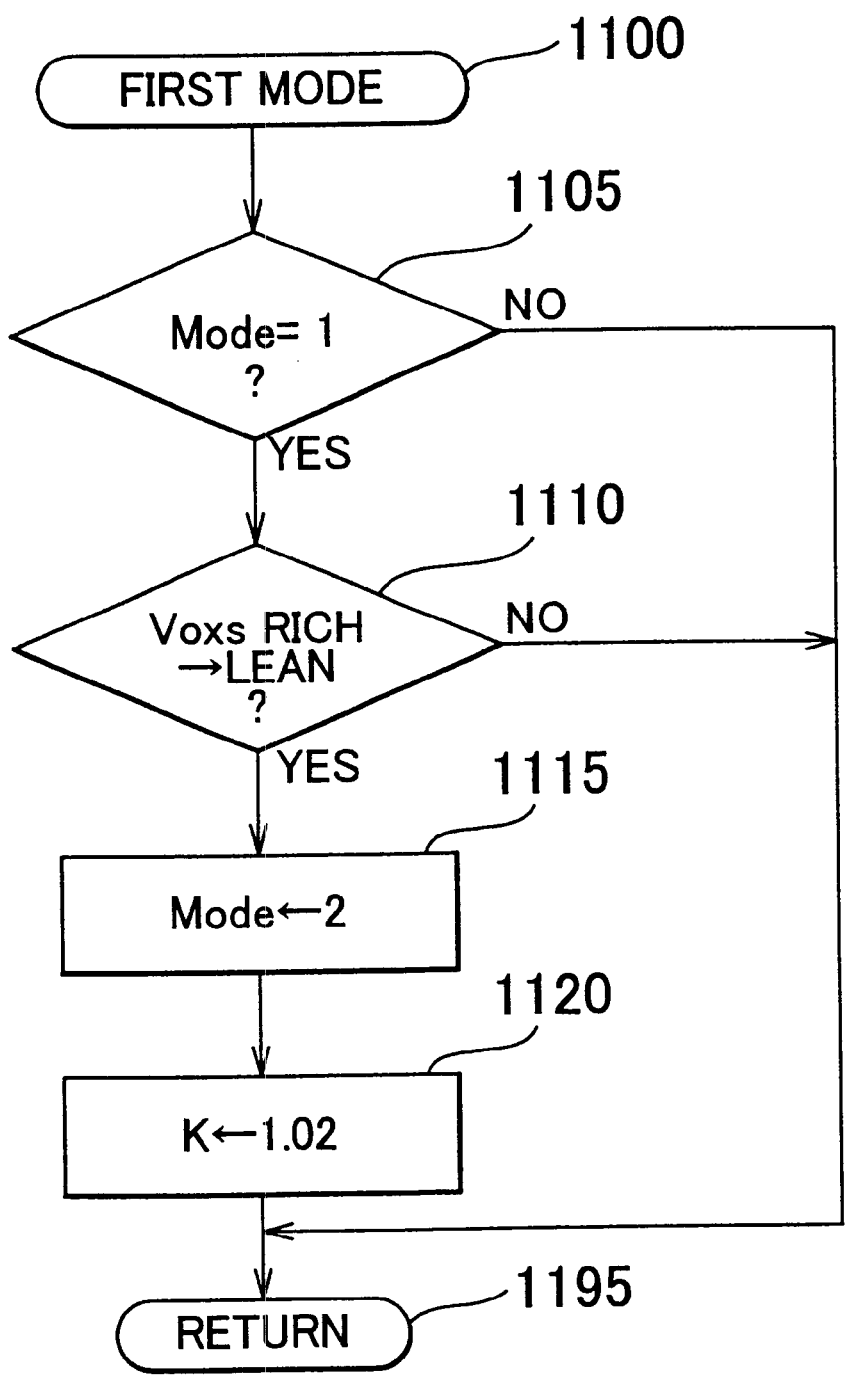
FIG. 11 is a flowchart showing a first mode control routine to be executed by the CPU.

Also, the CPU 71 repeatedly executes a first mode control routine shown in FIG. 11 at predetermined time intervals. Referring to FIG. 11, the CPU 71 starts the routine at a specific time from step S1100. First, the CPU 71 determines in step 1105 whether "Mode" is 1. Here, since "Mode" was set to 1 in step S925, the CPU 71 judges "Yes" in step S1105. Next, it is determined in step S1110 whether the output Voxs of the downstream-side air-fuel ratio sensor 67 indicating a rich air-fuel ratio has changed to indicate a lean air-fuel ratio.

At this time, which is right after the air-fuel ratio in the internal combustion engine 10 has started to be controlled to the predetermined lean air-fuel ratio abyfLean, the air-fuel ratio indicated by the output Voxs is still rich of the stoichiometric air-fuel ratio. Therefore, the CPU 71 judges "No" in step S1110, after which the routine ends in step S1195.

Then, the CPU 71 repeats steps S1100 to S1110. At this time, however, because the air-fuel ratio in the internal combustion engine 10 is being reliably maintained substantially equal to the predetermined lean air-fuel ratio abyfLean, the output Voxs indicating a rich air-fuel ratio, as at the time t2 in FIG. 5, changes to indicate a lean air-fuel ratio when a certain period of time has passed. After this happens, the CPU 71 judges "Yes" in step S1110. Then, "Mode" is set to 2 in step S1115 and the setting coefficient K is set to 1.02 in step S1120, after which the routine ends in step S1195.

As a result, the CPU 71 judges "No" in step S1005, and proceeds to step S1015 to determine whether "Mode" is 2. At this time, because "Mode" was set to 2 in step S1115, the CPU 71 judges "Yes" in step S1015, and proceeds to step S1020 to set the target air-fuel ratio abyfr to the predetermined rich air-fuel ratio abyfRich, after which the routine ends in step S1095. Here, note that the quotient of the stoichiometric air-fuel ratio divided by the predetermined rich air-fuel ratio abyfRich is equal to the setting coefficient K (=1.02).

In this way, the sub-feedback control amount vafsfb is maintained to 0, and the feedback correction amount DFi is calculated based on the output vabyfs of the upstream-side air-fuel ratio sensor 66 and the target air-fuel ratio abyfr such that the air-fuel ratio upstream of the first catalyst 53 becomes equal to the target air-fuel ratio abyfr. As a result, during the routine shown in FIG. 6, the final fuel injection amount Fi is calculated in step S610 by adding the calculated feedback correction amount DFi to the feed-forward fuel supply amount that is the product of the basic injection amount Fbase and 1.02 (i.e., coefficient K), and the same amount of fuel is injected. Thus, the air-fuel ratio in the internal combustion engine 10 is immediately controlled to the predetermined rich air-fuel ratio abyfRich that is rich of the stoichiometric air-fuel ratio.

Subsequently, the CPU 71 repeats the routine of FIG. 11 from step S1100. However, because "Mode" was set to 2 as aforementioned, the CPU 71 judges "No" in step S1105 and the routine ends in step S1195.

Figure 12:
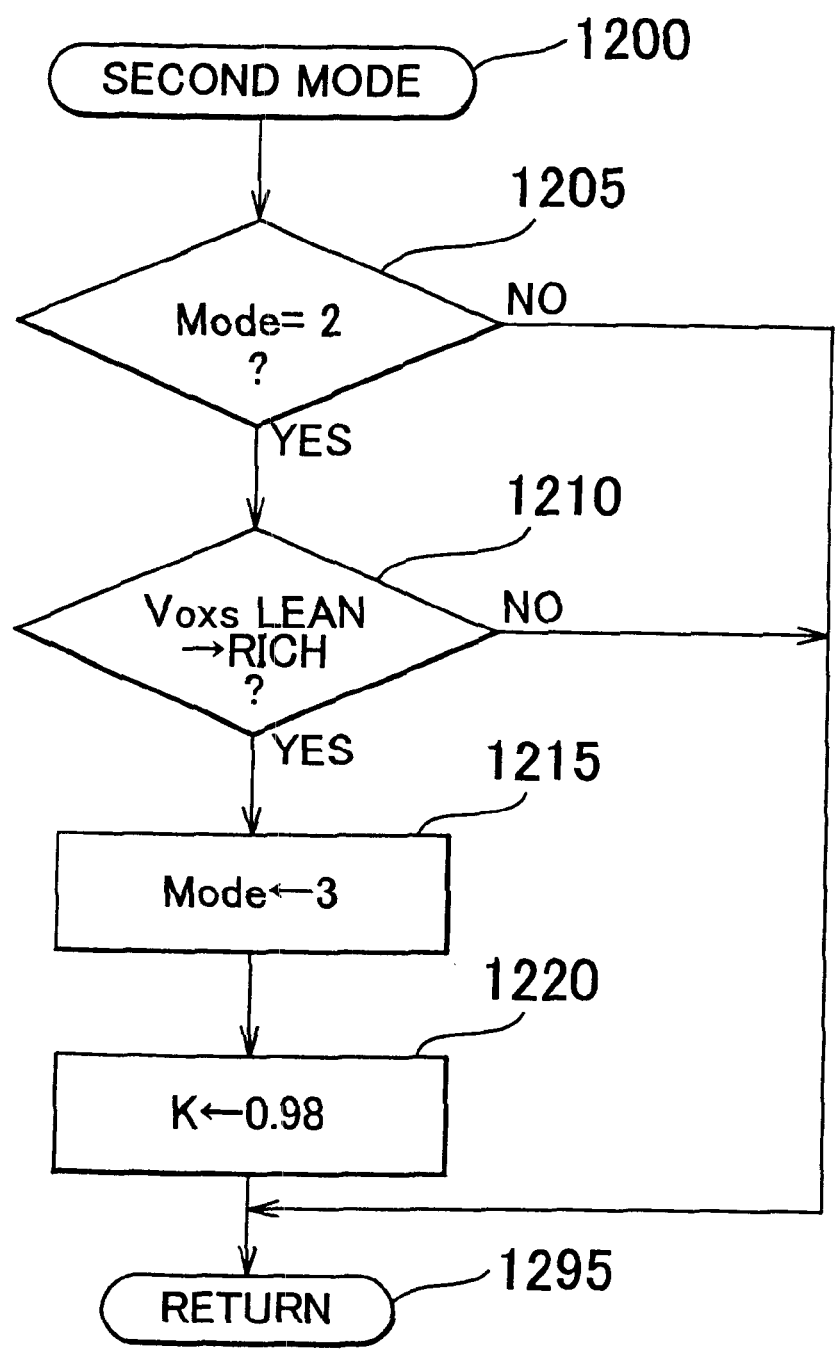
FIG. 12 is a flowchart showing a second mode control routine to be executed by the CPU.

Also, the CPU 71 repeatedly executes a second mode control routine shown in FIG. 12 at predetermined time intervals. Referring to FIG. 12, the CPU 71 starts the routine at a specific time from step S1200, and proceeds to step S1205 to determine whether "Mode" is 2. Here, since "Mode" is presently 2 as mentioned above, the CPU 71 judges "Yes", and proceeds to step S1210 to determine whether the output Voxs of the downstream-side air-fuel ratio sensor 67 indicating a lean air-fuel ratio has changed to indicate a rich air-fuel ratio. If not, the CPU 71 proceeds to step S1295.

Conversely, when the output Voxs of the upstream-side air-fuel ratio sensor 66 indicating a lean air-fuel ratio has changed to indicate a rich air-fuel ratio as at the time t3 in FIG. 5, the CPU 71 judges "Yes" in step S1210, and sets "Mode" to 3 in step S1215 to initiate a "third mode." Subsequently, the CPU 71 proceeds to step S1220 to set the setting coefficient K to 0.98. As a result, during the routine shown in FIG. 10, the CPU 71 judges "Yes" in step S1005, and proceeds to step S1010 to set the target air-fuel ratio abyfr to the predetermined lean air-fuel ratio abyfLean. Thus, the air-fuel ratio in the internal combustion engine 10 is again controlled to the predetermined lean air-fuel ratio abyfLean as in the above-described case where "Mode" is 1.

Figure 13:
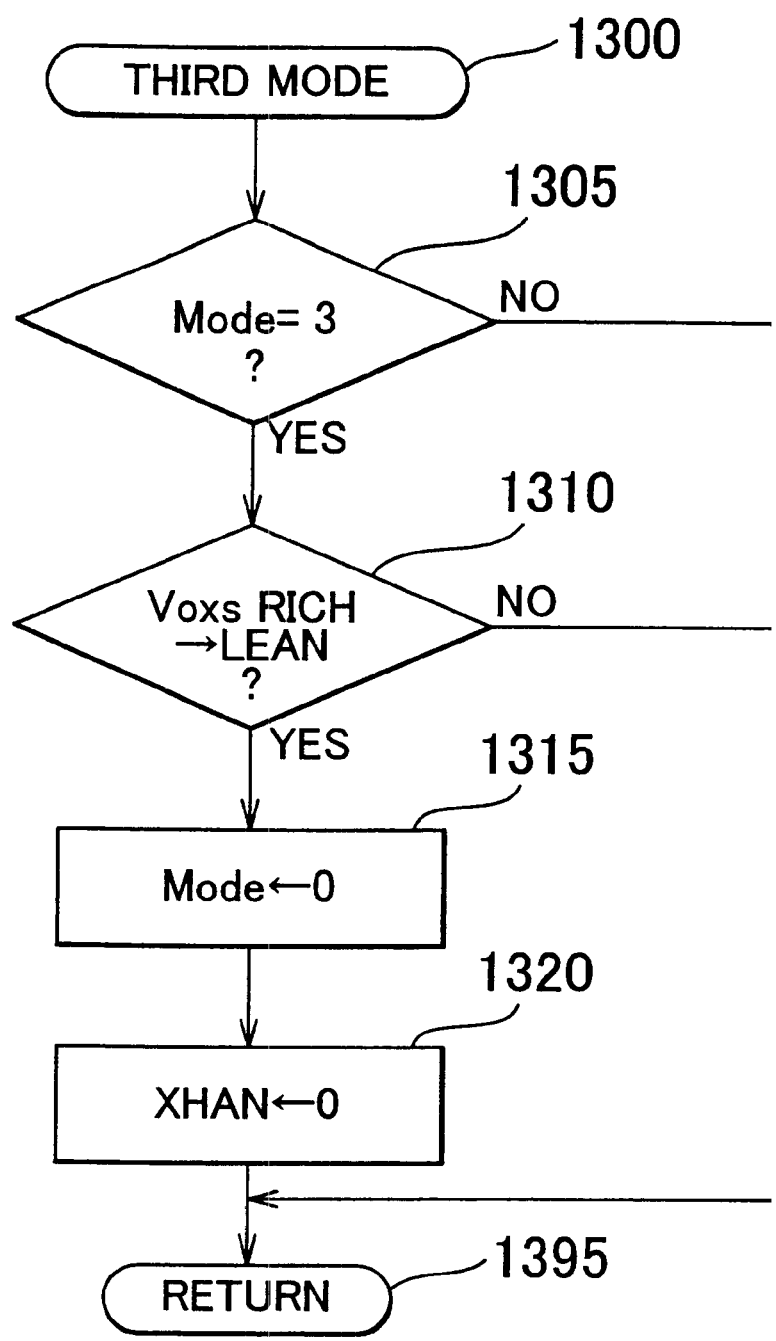
FIG. 13 is a flowchart showing a third mode control routine to be executed by the CPU.

Also, the CPU 71 repeatedly executes a third mode control routine shown in FIG. 13 at predetermined time intervals. Referring to FIG. 13, the CPU 71 starts the routine at a specific time from step S1300. First, the CPU 71 proceeds to step S1305 to determine whether "Mode" is 3. Since "Mode" has been set to 3 as mentioned above, the CPU 71 judges "Yes", and proceeds to step S1310 to determine whether the output Voxs of the downstream-side air-fuel ratio sensor 67 indicating a rich air-fuel ratio has changed to indicate a lean air-fuel ratio.

When the output Voxs of the upstream-side air-fuel ratio sensor 66 indicating a rich air-fuel ratio changes to indicate a lean air-fuel ratio as at the time t4 in FIG. 5, the CPU 71 judges "Yes" in S1310, and resets "Mode" to 0 in step S1315. Subsequently, the CPU 71 proceeds to step S1320 to set the flag XHAN to 0, after which the routine ends in step S1395.

Thus, during the routine of FIG. 9, the CPU 71 judges "Yes" in step S905, and resets the setting coefficient K to 1 in step S910. Also, as a result of "Mode" having been reset to 0 in the aforementioned step, the CPU 71 judges "No" in steps S1005 and S1015 during the routine of FIG. 10. Thus, the CPU 71 proceeds step S1025 to reset the target air-fuel ratio abyfr to the stoichiometric air-fuel ratio stoich. Also, as a result of the flag XHAN having been reset to 0, the CPU 71 judges "Yes" in step S805 during the routine of FIG. 8 if other sub-feedback control conditions all been satisfied. So the sub-feedback control resumes, whereby the feedback control resumes in order to achieve the stoichiometric air-fuel ratio.

In this way, when the maximum storable oxygen amount calculation conditions have all been satisfied, the air-fuel ratio in the internal combustion engine is controlled in order to the predetermined lean air-fuel ratio abyfLean, the predetermined rich air-fuel ratio abyfRich, and the predetermined lean air-fuel ratio abyfLean.

Figure 14:
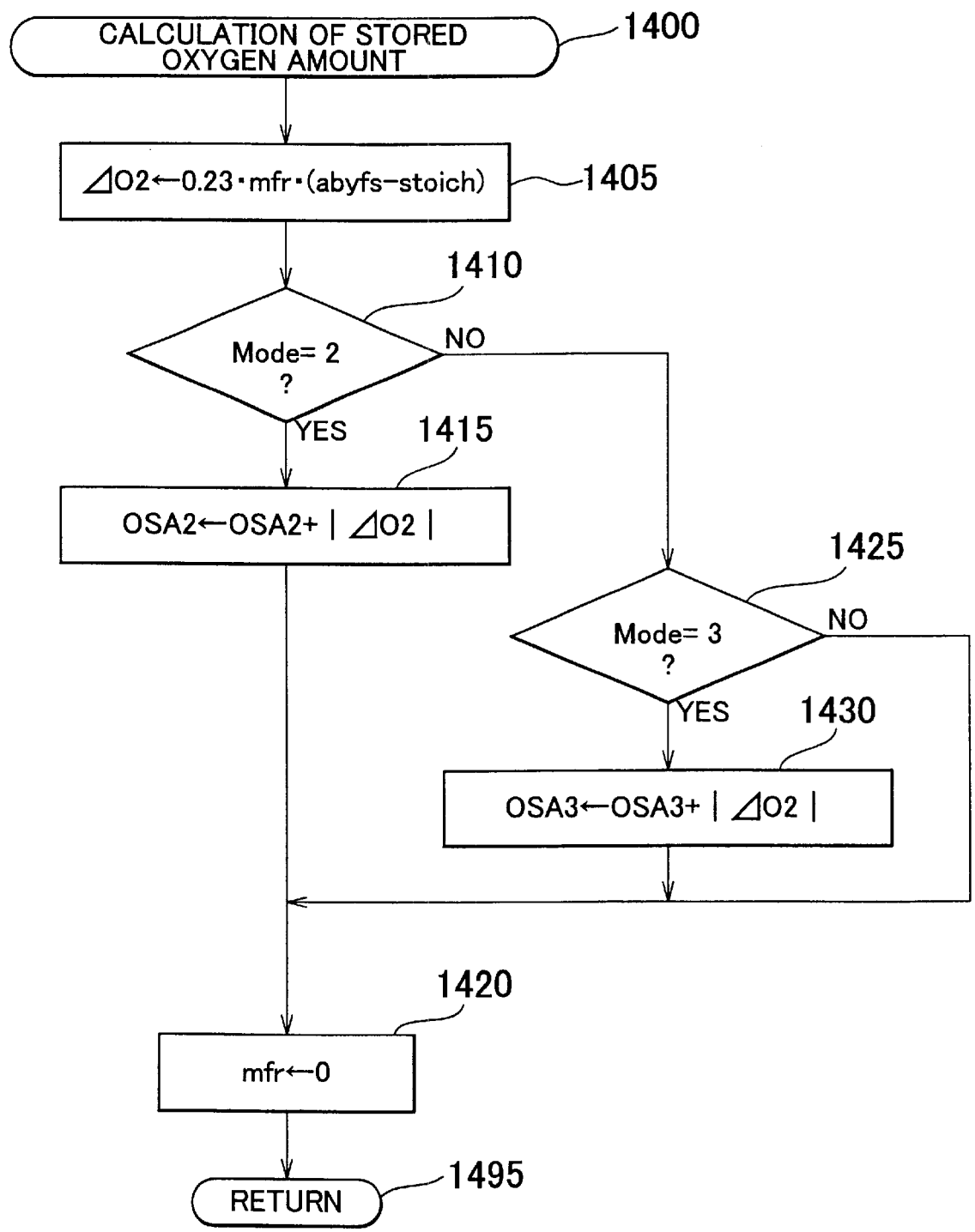
FIG. 14 is a routine to be executed by the CPU for calculating the stored oxygen amount of the first catalyst.
Figure 15:
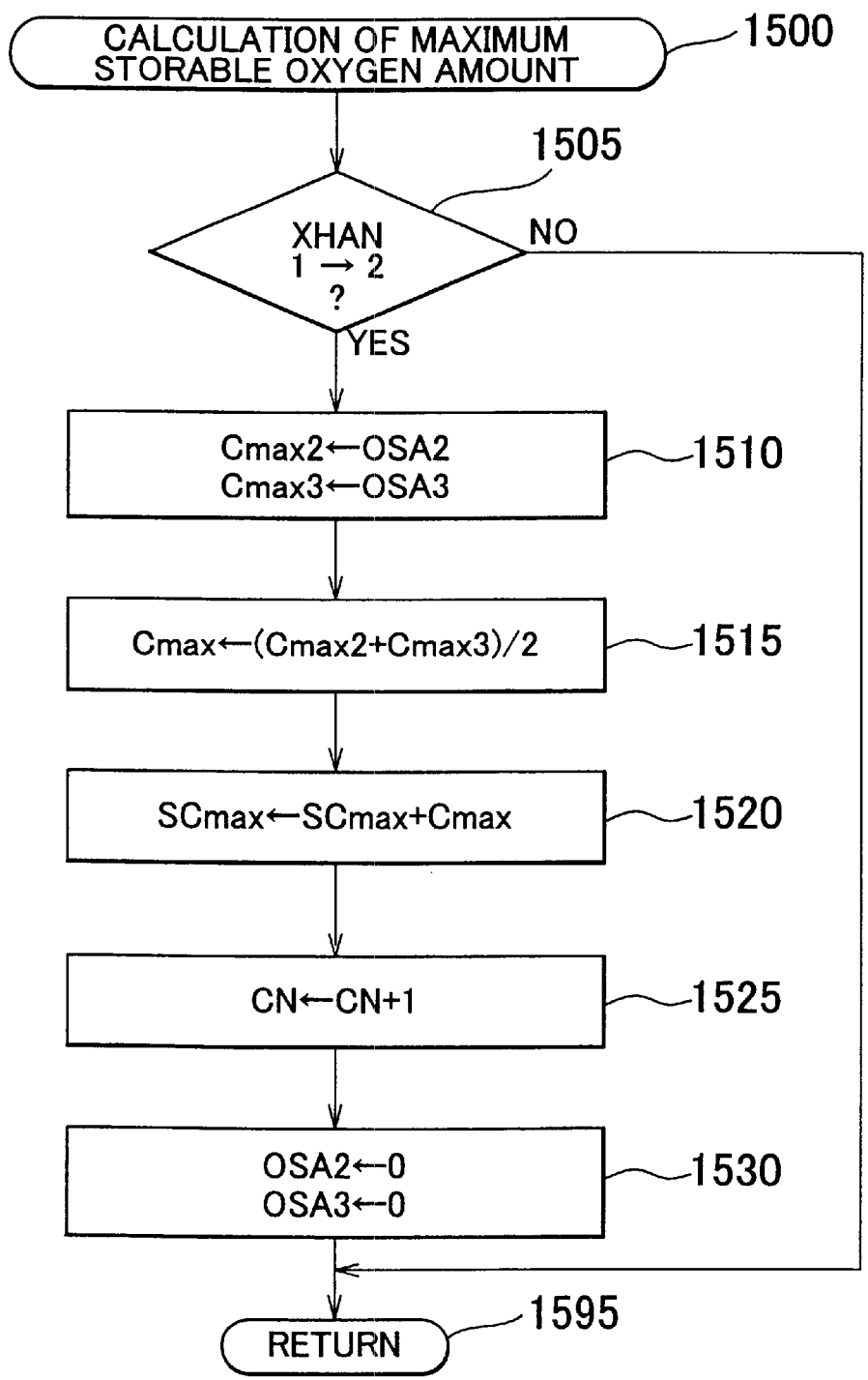
FIG. 15 is a routine to be executed by the CPU for calculating the maximum storable oxygen amount of the first catalyst.

Also, the CPU 71 repeatedly executes each of routines shown in FIGS. 14 and 15 at predetermined time intervals for calculating the maximum storable oxygen amount Cmax of the first catalyst 53. First, the CPU 71 starts the routine of FIG. 14 at a specific time from step S1400. Referring to FIG. 14, the CPU 71 proceeds to step S1405 to determine the stored oxygen change amount ΔO2 by an expression 7 shown below $$\Delta O2 = 0.23 \cdot mfr \cdot (abyfs - stoich) \tag{7}$$

Subsequently, the CPU 71 proceeds to step S1410 to determine whether "Mode" is 2. If yes, the CPU 71 proceeds to step S1415 to update stored oxygen amount OSA2 by adding the absolute value of the stored oxygen change amount ΔO2. The CPU 71 then proceeds to step S1420 to reset the total injection amount mfr representing the accumulated fuel injection amount Fi to 0, after which the routine ends in step S1495.

These processes in steps S1405 to 1420 are repeated as long as "Mode" is 2. Namely, the stored oxygen amount OSA2 of the first catalyst 53 is in the second mode (Mode= 2) where the air-fuel ratio upstream of the first catalyst 53 is maintained at the predetermined rich air-fuel ratio abyfRich.

If other mode than the second mode is presently set, conversely, the CPU 71 judges "No" in step S1410, and determines whether "Mode" is 3 in step S1425. If yes, the CPU 71 proceeds to step S1430 to update a stored oxygen amount OSA3 by adding the absolute value of the stored oxygen change amount ΔO2. The CPU 71 then proceeds to step S1420 to reset the total injection amount mfr to 0, after which the routine ends in step S1495.

These processes in steps S1400, S1405, S1410, S1425, S1430, and S1420 are repeated as long as "Mode" is 3. Namely, the stored oxygen amount OSA3 of the first catalyst 53 is calculated in the third mode (Mode=3) where the air-fuel ratio upstream of the first catalyst 53 is maintained at the predetermined lean air-fuel ratio abyfLean. If the CPU 71 judges "No" in step S1425, the CPU 71 proceeds to step S1420 as shown in FIG. 14.

Also, FIG. 15 is a flowchart showing a routine for calculating the maximum storable oxygen amount, which is repeatedly executed by the CPU 71 at predetermined time intervals. Referring to FIG. 15, the CPU 71 starts the routine at a specific time from step S1500. First, in step S1505, the CPU 71 monitors whether the flag XHAN has changed from 1 to 0.

If the third mode ends and the flag XHAN is changed to 0 in step S1320 during the routine shown in FIG. 13, the CPU 71 judges "Yes" in step S1505, and proceeds to step S1510. If the flag XHAN does not change from 1 to 0, conversely, the CPU 71 proceeds to S1595 to finish the routine.

On the presumption that the third mode has just ended and the flag XHAN has just changed from 1 to 0, the CPU 71 judges "Yes" in step S1505, and saves the present stored oxygen amounts OSA2 and OSA3 as the maximum storable oxygen amounts Cmax2 and Cmax 3, respectively, in step S1510. Subsequently, in step S1515, the CPU 71 obtains the average value of the maximum storable oxygen amounts Cmax2 and Cmax3, and saves the obtained average value as the maximum storable oxygen amount Cmax of the first catalyst 53.

Next, the CPU 71 proceeds to step S1520 to update a total maximum storable oxygen amount SCmax, representing the accumulated maximum storable oxygen amount Cmax, by adding the maximum storable oxygen amount Cmax newly determined in step S1515. Then, the CPU 71 proceeds to step S1525 to advance a counter CN to 1. The counter CN represents the number of times the maximum storable oxygen amount Cmax has been accumulated to the total maximum storable oxygen amount SCmax. Subsequently, the CPU 71 proceeds to step S1530 to reset both the stored oxygen amount OSA2 and the stored oxygen amount OSA3 to 0, after which the routine ends in step S1595. In this way, the maximum storable oxygen amount Cmax is calculated, and the total maximum storable oxygen amount SCmax and the counter CN are updated.

Figure 16:
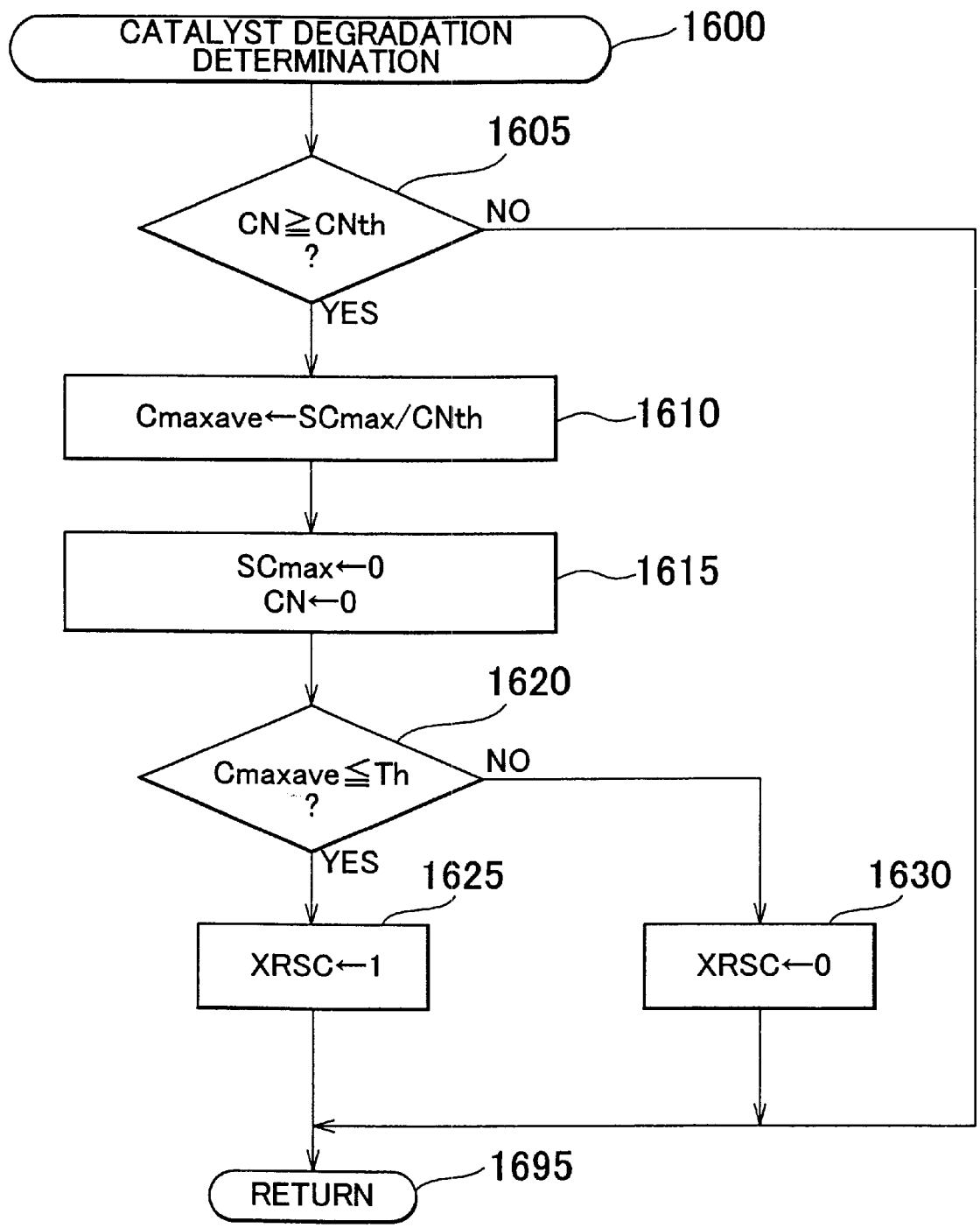
FIG. 16 is a routine to be executed by the CPU for determining whether the first catalyst has degraded.

FIG. 16 is a flowchart showing a routine for determining the degradation of the first catalyst 53, which is repeatedly executed by the CPU 71 at predetermined time intervals. Referring to FIG. 16, the CPU 71 starts the routine at a specific time from step S1600. First, it is determined in step S1605 whether the counter CN is equal to or greater than a threshold CNth. If not, the CPU 71 judges "No" in step S1605, after which the routine ends in step S1695.

When the counter CN has reached the threshold CNth after calculating the maximum storable oxygen amount Cmax for a certain number of times, the CPU 71 then judges "Yes" in step S1605, and proceeds to step S1610. In this step, an average maximum storable oxygen amount Cmaxave is determined by dividing the total maximum storable oxygen amount SCmax by the threshold CNth.

Subsequently, the CPU 71 resets both the total maximum storable oxygen amount SCmax and the counter CN to 0 in step S1615, and determines in step S1620 whether the average maximum storable oxygen amount Cmaxave is equal to or smaller than a threshold Th. If yes, the CPU 71 determines that the first catalyst 53 is in a degraded state, and sets a flag XRSC to 1 in step S1625, after which the routine ends in step S1695. The flag XRSC is set to 1 when it is determined that the first catalyst 53 is in a degraded state, and is set to 0 when it is determined that the first catalyst 53 is not in a degraded state, thus indicating the determination result on the catalyst degradation.

If it is determined in step S1620 that the maximum storable oxygen amount Cmaxave is greater than the threshold Th, the CPU 71 determines that the first catalyst 53 has not yet degraded, and sets the flag XRSC to 0 in step S1630, after which the routine ends in step S1695. Thus, the determination result is saved in the RAM 74.

As described above, when the maximum storable oxygen amount Cmax of the first catalyst 53 has been determined for a certain number (i.e., CNth) of times, it is determined whether the average maximum storable oxygen amount Cmaxave is equal to or smaller than the threshold Th, and the CPU 71 determines that the first catalyst 53 is a degraded state if the maximum storable oxygen amount Cmaxave is equal to or smaller than the threshold Th.

With the air-fuel ratio control system of the embodiment described above, provided that the maximum storable oxygen amount calculation conditions have all been satisfied, the target value of the air-fuel ratio upstream of the first catalyst 53 is set to a certain lean air-fuel ratio upon determining that the output of the downstream-side air-fuel ratio sensor 67 indicating a lean air-fuel ratio has changed to indicate a rich air-fuel ratio. Then, the feedback control amount is determined such that the air-fuel ratio detected by the upstream-side air-fuel ratio sensor 66 matches its target air-fuel ratio. Even if this feedback control, to be performed based on the air-fuel ratio detected by the upstream-side air-fuel ratio sensor 66, is not carried out, a fuel supply amount required for the air-fuel ratio upstream of the first catalyst 53 to become lean is obtained as the feed-forward amount, and the fuel supply amount thus obtained is corrected using the feedback control amount that is determined based on the air-fuel ratio detected by the upstream-side air-fuel ratio sensor 66.

With this arrangement, although the stored oxygen amount of the first catalyst 53 is zero at the moment the output of the downstream-side air-fuel ratio sensor 67 indicating a lean air-fuel ratio changes to indicate a rich air-fuel ratio, the air-fuel ratio of the gas flowing into the first catalyst 53 is immediately made lean by supplying the same amount of fuel as the feed-forward amount, thereby avoiding the emission of a large amount of unburned fuel. Furthermore, according to the above feedback control, the air-fuel ratio of the gas flowing into the first catalyst 53 is reliably controlled to the predetermined lean air-fuel ratio. This achieves further accuracy in determining the maximum storable oxygen amount indicating the degradation degree of the first catalyst 53. Also, since the air-fuel ratio in the internal combustion engine 10 is prevented from becoming excessively lean by the above feedback control, a deterioration in the drivability of the vehicle, which may otherwise be caused, can be avoided.

Likewise, with the air-fuel ratio control system of the embodiment, the target value of the air-fuel ratio upstream of the first catalyst 53 is set to a certain rich air-fuel ratio upon determining that the output of the downstream-side air-fuel ratio sensor 67 indicating a rich air-fuel ratio has changed to indicate a lean air-fuel ratio. Then, the feedback control amount is determined such that the air-fuel ratio detected by the upstream-side air-fuel ratio sensor 66 matches its target air-fuel ratio. Even if this feedback control, to be performed based on the air-fuel ratio detected by the upstream-side air-fuel ratio sensor 66, is not carried out, a fuel supply amount required for causing the air-fuel ratio upstream of the first catalyst 53 to become rich is obtained as the feed-forward amount, and the fuel supply amount thus obtained is corrected using the feedback control amount.

With this arrangement, although the stored oxygen amount of the first catalyst 53 is maximum at the moment the output of the downstream-side air-fuel ratio sensor 67 indicating a rich air-fuel ratio changes to indicate a lean air-fuel ratio, the air-fuel ratio of the gas flowing into the first catalyst 53 is immediately made rich by supplying the same amount of fuel as the feed-forward amount, thereby avoiding the emission of a large amount of NOx. Furthermore, according to the air-fuel ratio feedback control, the air-fuel ratio of the gas flowing into the first catalyst 53 can be accurately controlled to the predetermined lean air-fuel ratio. This achieves further accuracy in determining the maximum storable oxygen amount indicating the degradation degree of the first catalyst 53. Also, since the air-fuel ratio in the internal combustion engine 10 is prevented from becoming excessively rich by the air-fuel ratio feedback control, a deterioration in the drivability of the vehicle, which may otherwise be caused, can be avoided.

It shall be noted that the invention is not limited to the foregoing exemplary embodiment, but may be implemented with further variations and modifications within the intended scope of the invention. For example, while the sub-feedback control incorporates a PI control in the foregoing embodiment, it may instead incorporate a so-called PID control. Also, the downstream-side air-fuel ratio sensor 67 may be of the same type as the upstream-side air-fuel ratio sensor 66.

Furthermore, while the target air-fuel ratio abyfr is switched, in the foregoing embodiment, between the predetermined rich air-fuel ratio abyfRich and the predetermined lean air-fuel ratio abyfLean for the purpose of determining the maximum storable oxygen amount, such switching of the target air-fuel ratio abyfr can also be carried out for accurately determining the operating conditions, such as a response speed (delay), and so on, of the downstream-side air-fuel ratio sensor 67.

Also, with the air-fuel ratio control system according the foregoing embodiment, the target air-fuel ratio abyfr is set to the predetermined lean air-fuel ratio abyfLean in the first mode, to the predetermined rich air-fuel ratio abyfRich in the second mode, and to the abyfLean in the third mode in this order, and the average value of the maximum storable oxygen amount Cmax2 obtained during the second mode and the maximum storable oxygen amount Cmax3 obtained in the third mode is determined as the maximum storable oxygen amount Cmax. Alternatively, the second mode and third mode may be alternately repeated for several times (i.e., 4 times for each mode), and the average value of the maximum storable oxygen amounts thus determined multiple times in each mode may be determined as the maximum adorable oxygen amount Cmax.

Also, the feed-forward fuel supply amount may be a value which becomes largest right after the target air-fuel ratio has been switched, and which subsequently decreases in time. Moreover, the feed-forward fuel supply amount may be set in a different manner from that employed in the foregoing embodiment as long as it is set such that the air-fuel ratio of the gas flowing into the catalyst immediately changes across the stoichiometric air-fuel ratio to the target air-fuel ratio after switching the same target air-fuel ratio.

Also, in the case where the stored oxygen amount calculation conditions have all been satisfied with the output Voxs of the downstream-side air-fuel ratio sensor 67 indicating a lean air-fuel ratio, the feedback control may be started from the second mode where the air-fuel ratio upstream of the first catalyst 53 is controlled to the predetermined lean air-fuel ratio. However, the maximum storable oxygen amount Cmax2 estimated at this time is likely to be inaccurate, so the corresponding data is deleted. Subsequently, the feedback control may proceed through the third mode and the second mode to obtain the maximum storable oxygen amounts Cmax3 and Cmax2, and the average value of these amounts may be determined as the maximum storable oxygen amount Cmax.

What is claimed is:

1. An air-fuel ratio control system for an internal combustion engine including an exhaust passage and a catalyst disposed in the exhaust passage, comprising:

intake volume obtaining means for obtaining a value corresponding to an intake volume of the internal combustion engine;

upstream-side air-fuel ratio detecting means for detecting an air-fuel ratio upstream of the catalyst;

downstream-side air-fuel ratio detecting means for detecting an air-fuel ratio downstream of the catalyst;

target air-fuel ratio setting means which sets a target air-fuel ratio to a predetermined rich air-fuel ratio that is rich of a stoichiometric air-fuel ratio when it is determined that the air-fuel ratio downstream of the catalyst has changed from a rich air-fuel ratio to a lean air-fuel ratio, and which sets the target air-fuel ratio to a predetermined lean air-fuel ratio that is lean of the stoichiometric air-fuel ratio when it is determined that the air-fuel ratio downstream of the catalyst has changed from a lean air-fuel ratio to a rich air-fuel ratio;

fuel supply amount calculating means which calculates, as a feed-forward fuel supply amount, a fuel amount required for an air-fuel ratio of an air-fuel mixture, to be supplied to the internal combustion engine, to become rich of the stoichiometric air-fuel ratio on the basis of at least the detected intake volume when the target air-fuel ratio is set to the predetermined rich air-fuel ratio; which calculates, as the feed-forward fuel supply amount, a fuel amount required for the air-fuel ratio of the air-fuel mixture, to be supplied to the internal combustion engine, to become lean of the stoichiometric air-fuel ratio on the basis of at least the detected intake volume when the target air-fuel ratio is set to the predetermined lean air-fuel ratio; which calculates a feedback correction amount based on the air-fuel ratio detected by the upstream-side air-fuel ratio detecting means and the target air-fuel ratio such that the air-fuel ratio detected by the upstream-side air-fuel ratio detecting means matches the target air-fuel ratio; and which determines the feed-forward fuel supply amount corrected by the feedback correction amount as a final fuel supply amount; and fuel supplying means for supplying the internal combustion engine with the same amount of fuel as the final fuel supply amount.

2. The air-fuel ratio control system according to claim 1, further comprising:

maximum storable oxygen amount calculating means which determines an amount of oxygen flowing into the catalyst from when the target air-fuel ratio is changed to the predetermined lean air-fuel ratio to when the air-fuel ratio detected by the downstream-side air-fuel ratio detecting means changes from a rich air-fuel ratio that is rich of the stoichiometric air-fuel ratio to a lean air-fuel ratio that is lean of the stoichiometric air-fuel ratio; and which calculates a maximum storable oxygen amount of the catalyst on the basis of that determined amount of oxygen.

3. The air-fuel ratio control system according to claim 1, further comprising:

maximum storable oxygen amount calculating means which determines an amount of oxygen flowing into the catalyst from when the target air-fuel ratio is changed to the predetermined rich air-fuel ratio to when the air-fuel ratio detected by the downstream-side air-fuel ratio detecting means changes from a lean air-fuel ratio that is lean of the stoichiometric air-fuel ratio to a rich air-fuel ratio that is rich of the stoichiometric air-fuel ratio; and which calculates a maximum storable oxygen amount of the catalyst on the basis of that determined amount of oxygen.

4. The air-fuel ratio control system according to claim 1, wherein the fuel supply amount calculating means is adapted to calculate, as the feed-forward fuel supply amount, a fuel amount theoretically required for an air-fuel ratio of an air-fuel mixture, to be supplied to the internal combustion engine, to match the target air-fuel ratio on the basis of the value corresponding to the intake volume and the target air-fuel ratio.

5. The air-fuel ratio control system according to claim 4, further comprising:

maximum storable oxygen amount calculating means which determines an amount of oxygen flowing into the catalyst from when the target air-fuel ratio is changed to the predetermined lean air-fuel ratio to when the air-fuel ratio detected by the downstream-side air-fuel ratio detecting means changes from a rich air-fuel ratio that is rich of the stoichiometric air-fuel ratio to a lean air-fuel ratio that is lean of the stoichiometric air-fuel ratio; and which calculates a maximum storable oxygen amount of the catalyst on the basis of that determined amount of oxygen.

6. The air-fuel ratio control system according to claim 4, further comprising:

maximum storable oxygen amount calculating means which determines an amount of oxygen flowing into the catalyst from when the target air-fuel ratio is changed to the predetermined rich air-fuel ratio to when the air-fuel ratio detected by the downstream-side air-fuel ratio detecting means changes from a lean air-fuel ratio that is lean of the stoichiometric air-fuel ratio to a rich air-fuel ratio that is rich of the stoichiometric air-fuel ratio; and which calculates a maximum storable oxygen amount of the catalyst on the basis of that determined amount of oxygen.

7. An air-fuel ratio control method for an internal combustion engine including an exhaust passage and a catalyst disposed in the exhaust passage, comprising the steps of:

obtaining a value corresponding to an intake volume of the internal combustion engine;

detecting an air-fuel ratio upstream of the catalyst;

detecting an air-fuel ratio downstream of the catalyst;

setting a target air-fuel ratio to a predetermined rich air-fuel ratio that is rich of a stoichiometric air-fuel ratio when it is determined that the air-fuel ratio downstream of the catalyst has changed from a rich air-fuel ratio to a lean air-fuel ratio;

setting the target air-fuel ratio to a predetermined lean air-fuel ratio that is lean of the stoichiometric air-fuel ratio when it is determined that the air-fuel ratio downstream of the catalyst has changed from a lean air-fuel ratio to a rich air-fuel ratio;

calculating, as a feed-forward fuel supply amount, a fuel amount required for an air-fuel ratio of an air-fuel mixture, to be supplied to the internal combustion engine, to become rich of the stoichiometric air-fuel ratio on the basis of at least the intake volume when the target air-fuel ratio is set to the predetermined rich air-fuel ratio;

calculating, as the feed-forward fuel supply amount, a fuel amount required for the air-fuel ratio of the air-fuel mixture, to be supplied to the internal combustion engine, to become lean of the stoichiometric air-fuel ratio on the basis of at least the intake volume when the target air-fuel ratio is set to the predetermined lean air-fuel ratio;

calculating a feedback correction amount based on the air-fuel ratio detected by the upstream-side air-fuel ratio detecting means and the target air-fuel ratio such that the air-fuel ratio detected by the upstream-side air-fuel ratio detecting means matches the target air-fuel ratio;

determining, as a final fuel supply amount, the feedforward fuel supply amount corrected by the feedback correction amount; and supplying the internal combustion engine with the same amount of fuel as the final fuel supply amount.

8. The air-fuel ratio control method according to claim 7, further comprising the steps of:

determining an amount of oxygen flowing into the catalyst from when the target air-fuel ratio is changed to the predetermined lean air-fuel ratio to when the air-fuel ratio downstream of the catalyst changes from a rich air-fuel ratio that is rich of the stoichiometric air-fuel ratio to a lean air-fuel ratio that is lean of the stoichiometric air-fuel ratio; and calculating a maximum storable oxygen amount of the catalyst on the basis of that determined amount of oxygen.

9. The air-fuel ratio control method according to claim 7, further comprising the steps of:

determining an amount of oxygen flowing into the catalyst from when the target air-fuel ratio is changed to the predetermined rich air-fuel ratio to when the air-fuel ratio downstream of the catalyst changes from a lean air-fuel ratio that is lean of the stoichiometric air-fuel ratio to a rich air-fuel ratio that is rich of the stoichiometric air-fuel ratio; and calculating a maximum storable oxygen amount of the catalyst on the basis of that determined amount of oxygen.

* * * * *